(12) United States Patent
Taghipoor

(10) Patent No.: US 12,729,624 B2
(45) Date of Patent: Sep. 8, 2026

(54) SYSTEM AND METHOD FOR MEASURING STRESS IN A ROCK MASS

(71) Applicant: GEOMECHANICAL SERVICES AND INNOVATIONS INC., Sudbury (CA)

(72) Inventor: Siavash Taghipoor, Sudbury (CA)

(73) Assignee: GEOMECHANICAL SERVICES AND INNOVATIONS INC., Sudbury (CA)

( * ) Notice: Subject to any disclaimer, the term of this patent is extended or adjusted under 35 U.S.C. 154(b) by 0 days.

(21) Appl. No.: 19/085,318

(22) Filed: Mar. 20, 2025

(65) Prior Publication Data

US 2026/0009328 A1 Jan. 8, 2026

Related U.S. Application Data

(60) Provisional application No. 63/667,747, filed on Jul. 4, 2024, provisional application No. 63/568,764, filed on Mar. 22, 2024.

(30) Foreign Application Priority Data

Jul. 24, 2024 (CA) ................................ CA 3249694

(51) Int. Cl.
*E21B 43/26* (2006.01)
*E21B 49/00* (2006.01)
*G01V 99/00* (2009.01)

(52) U.S. Cl.
CPC ............ *E21B 49/006* (2013.01); *E21B 43/26* (2013.01); *G01V 99/00* (2013.01)

(58) Field of Classification Search
CPC ......... E21B 43/26; E21B 43/30; E21B 43/305
See application file for complete search history.

(56) References Cited

U.S. PATENT DOCUMENTS 3,482,443 A * 12/1969 Nichols, Jr. ........... E21B 49/006 73/152.53
3,796,091 A * 3/1974 Serata ...................... G01N 3/10 73/779

(Continued)

FOREIGN PATENT DOCUMENTS

CN 114136790 A 3/2022
WO 2018/035400 A2 2/2018

OTHER PUBLICATIONS

Fjaer et al., Chapter 11 Mechanics of hydraulic fracturing, Developments in Petroleum Science, vol. 53, 2008, p. 377.

(Continued)

*Primary Examiner* — Kenneth L Thompson
(74) *Attorney, Agent, or Firm* — Norton Rose Fulbright Canada LLP

(57) ABSTRACT

Systems and methods for measuring stress in a rock mass using sleeve fracturing are provided. A system for measuring stress in the rock mass includes an expandable sleeve insertable into a borehole formed in the rock mass and operable to apply a radially outward force against a wall of the borehole by expansion of the sleeve. A positive displacement pump is operatively connected to the sleeve and is operable to deliver a liquid to the sleeve at a constant flow rate to cause expansion of the sleeve. A pressure sensor is operable to measure a pressure of the liquid. A pressure recorder is operatively connected to the pressure sensor for recording the pressure of the liquid.

1 Claim, 24 Drawing Sheets

(56) References Cited

U.S. PATENT DOCUMENTS

| | | | | |
|---|---|---|---|---|
| 3,961,524 | A * | 6/1976 | de la Cruz | E21B 49/006 73/783 |
| 4,641,520 | A | 2/1987 | Mao | |
| 4,733,567 | A | 3/1988 | Serata | |
| 5,353,637 | A | 10/1994 | Plumb | |
| 5,540,101 | A * | 7/1996 | Capelle | E21B 47/00 73/783 |
| 7,513,167 | B1 | 4/2009 | Serata | |
| 8,978,461 | B2 * | 3/2015 | Li | E21B 47/007 73/152.59 |
| 9,303,508 | B2 | 4/2016 | Ramakrishnan | |
| 9,376,902 | B2 * | 6/2016 | Prioul | E21B 49/00 |
| 10,451,497 | B2 * | 10/2019 | Polsky | E21B 47/007 |
| 11,106,843 | B2 * | 8/2021 | Ma | E21B 49/00 |
| 11,255,184 | B1 * | 2/2022 | Xia | E21B 43/26 |
| 11,326,448 | B2 * | 5/2022 | Alruwaili | E21B 49/006 |
| 11,767,751 | B2 * | 9/2023 | Coenen | E21B 43/26 166/250.1 |
| 12,000,264 | B2 * | 6/2024 | Busetti | E21B 47/02 |
| 2021/0332701 | A1 | 10/2021 | Yu et al. | |

OTHER PUBLICATIONS

O. Stephansson, Rock stress measurement by sleeve fracturing, Paper No. ISRM-5CONGRESS-1983-216, 5th ISRM Congress, Apr. 1983, Melbourne, Australia.

M. King Hubbert, Mechanics of Hydraulic Fracturing, Aime Petroleum Transactions, Society of Petroleum Engineers, vol. 210, 1957, USA.

Ben-Guo He et al., An analytical solution for recovering the complete in-situ stress tensor from Flat Jack tests, International Journal of Rock Mechanics & Mining Sciences, Elsevier, 2015, Israel.

S. Serata et al., Double fracture method of in situ stress measurement in brittle rock, Rock Mechanics and Rock Engineering 25, 89-108, 1992, Austria.

Canadian Intellectual Property Office, Examiner's Requisition dated Oct. 30, 2025 re: Canadian patent application No. 3,249,694.

* cited by examiner

σ3
σ1
σ2
σ3
σ2
13
σ1
BA
16
18
12
B
36
Pressure Recorder
34
24
14
30
22
32
28
20
10
26
Actuator
Pump
A Flow Rate Qe, Qc
Or Motor Speed S
Controller
Motor
Gear Train
Feedback
20
24
Q
32
22
30
28
40
42
44
46
26,38
D
18
BA
4
L
12
24
16
17

16
48
σ1
12
BA
σ3
18
σ3
σ1
48

| Borehole Diameter D | Sleeve Length L | Test Interval Volume V | Flow Rate Qe, Qc | Motor Speed S |
|---|---|---|---|---|
| D1 | L1 | $V1 = \pi(D1/2)^2 \times L1$ | Q1 | S1 |
| D2 | L2 | $V2 = \pi(D2/2)^2 \times L2$ | Q2 | S2 |
| D3 | L3 | $V3 = \pi(D3/2)^2 \times L3$ | Q3 | S3 |
| D4 | L4 | $V4 = \pi(D4/2)^2 \times L4$ | Q4 | S4 |
| ... | ... | ... | ... | ... |
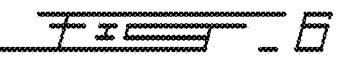

50A
50B
L
50
SP

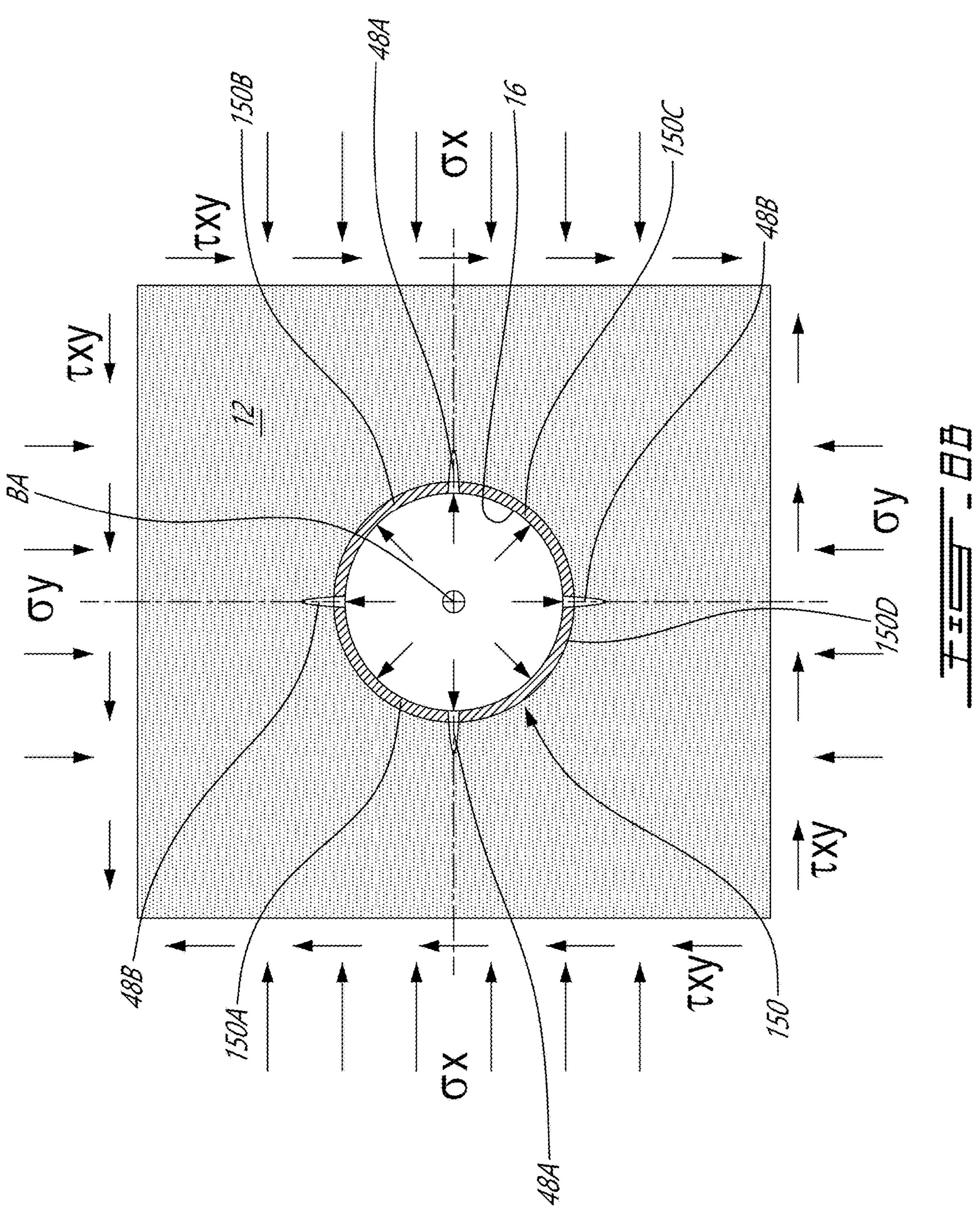
48A
150B
16
σx
150C
τxy
48B
τxy
12
BA
σy
σy
150D
150
48B
150A
σx
τxy
τxy
48A

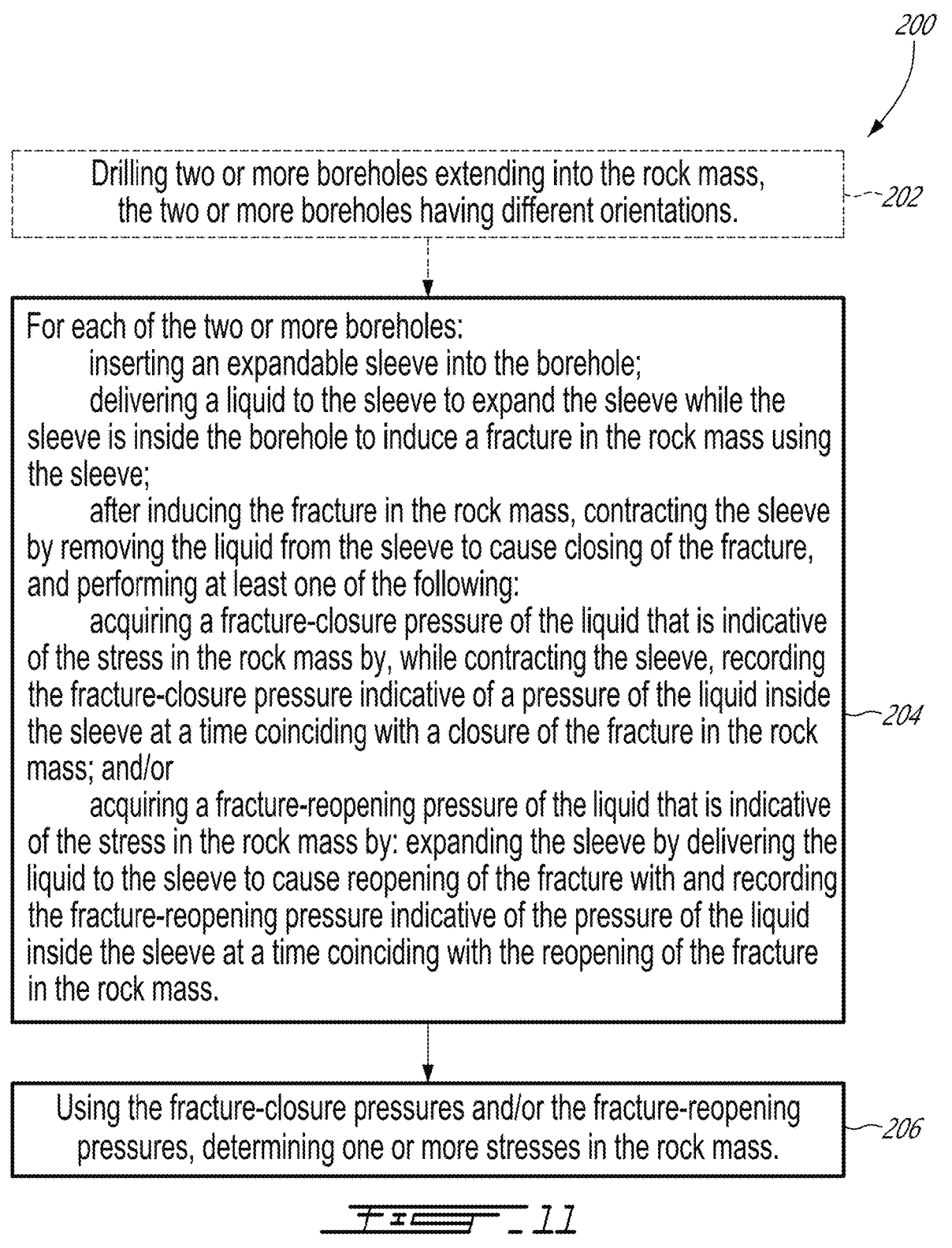

200

Drilling two or more boreholes extending into the rock mass, the two or more boreholes having different orientations. 202

For each of the two or more boreholes:
inserting an expandable sleeve into the borehole;
delivering a liquid to the sleeve to expand the sleeve while the sleeve is inside the borehole to induce a fracture in the rock mass using the sleeve;
after inducing the fracture in the rock mass, contracting the sleeve by removing the liquid from the sleeve to cause closing of the fracture, and performing at least one of the following:
acquiring a fracture-closure pressure of the liquid that is indicative of the stress in the rock mass by, while contracting the sleeve, recording the fracture-closure pressure indicative of a pressure of the liquid inside the sleeve at a time coinciding with a closure of the fracture in the rock mass; and/or
acquiring a fracture-reopening pressure of the liquid that is indicative of the stress in the rock mass by: expanding the sleeve by delivering the liquid to the sleeve to cause reopening of the fracture with and recording the fracture-reopening pressure indicative of the pressure of the liquid inside the sleeve at a time coinciding with the reopening of the fracture in the rock mass. 204

Using the fracture-closure pressures and/or the fracture-reopening pressures, determining one or more stresses in the rock mass. 206

FIG. 11

Easting
Northing
18
18
18
18
18
18
18
18
14

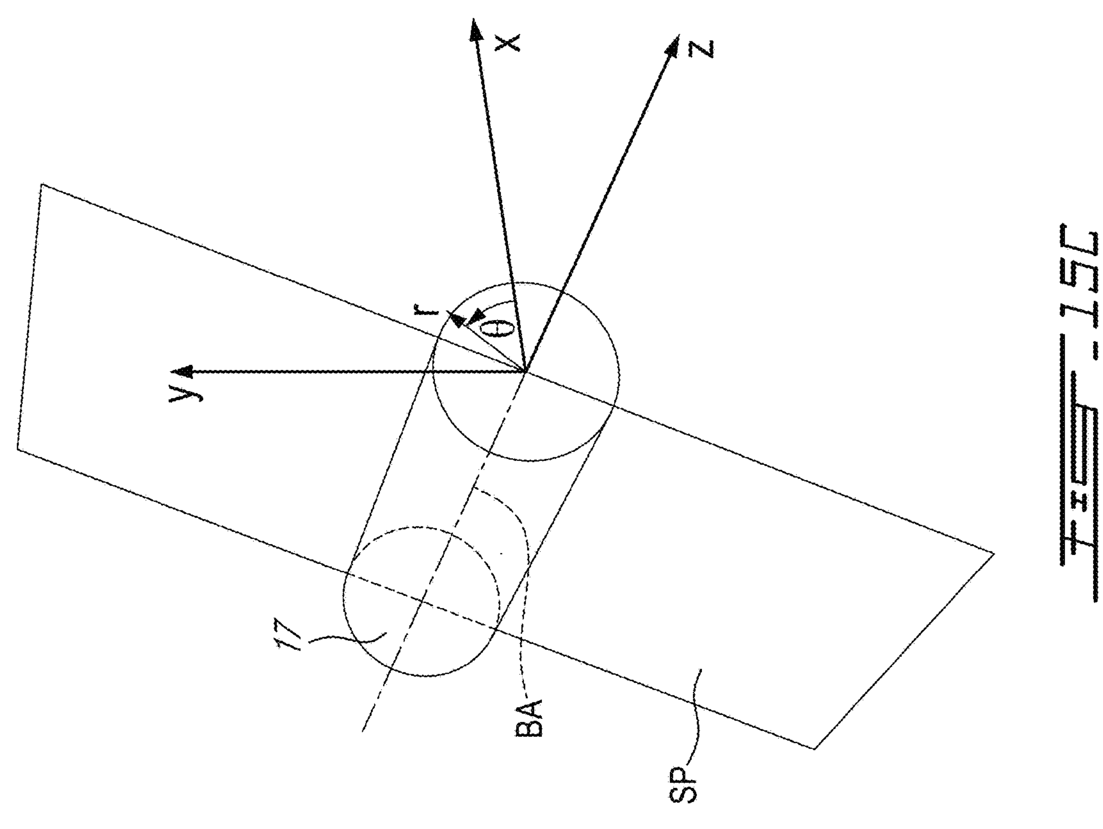
X
Z
y
r
θ
17
BA
SP
FIG-15C
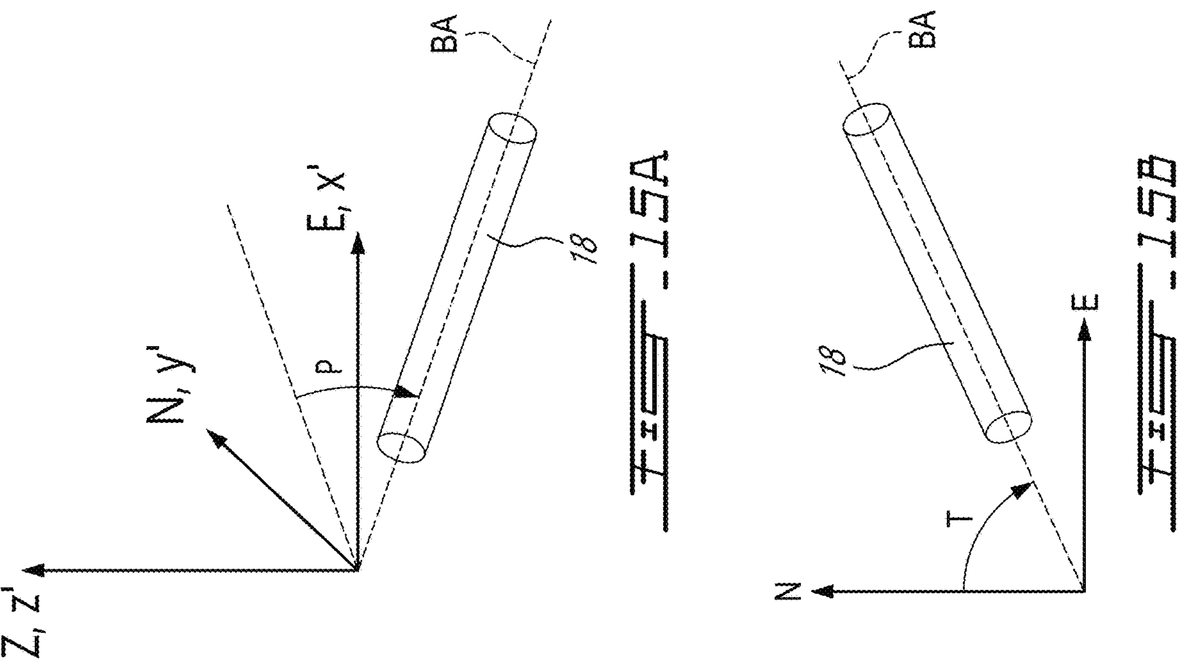
Z, z'
N, y'
E, x'
P
BA
18
FIG-15A
BA
18
E
N
T
FIG-15B

| Test # | T (deg) | P (deg) | $\theta$(deg) | $\sigma_\theta$ |
|---|---|---|---|---|
| 1 | **10** | 25 | 20 | -7.68 |
| 2 | **10** | 25 | 70 | -12.35 |
| 3 | **80** | 55 | 145 | -7.46 |
| 4 | **80** | 55 | 25 | -11.75 |
| 5 | **135** | 75 | 80 | -9.95 |
| 6 | **135** | 75 | 155 | -12.46 |

| $\sigma_x'$ | $\sigma_y'$ | $\sigma_z'$ | $\tau_{xy}'$ | $\tau_{xz}'$ | $\tau_{yz}'$ |
|---|---|---|---|---|---|
| -6.00 | -4.29 | -3.33 | 0.30 | 0.15 | 1.00 |

| Test # | T (deg) | P (deg) | θ(deg) | $\sigma_\theta$ |
|---|---|---|---|---|
| 1 | **25** | 25 | 20 | -8.97 |
| 2 | **25** | 25 | 70 | -10.62 |
| 3 | **63** | 75 | 38 | -9.41 |
| 4 | **63** | 75 | 52 | -10.09 |
| 5 | **140** | 60 | 30 | -15.70 |
| 6 | **140** | 60 | 60 | -15.94 |

| $\sigma_x'$ | $\sigma_y'$ | $\sigma_z'$ | $\tau_{xy}'$ | $\tau_{xz}'$ | $\tau_{yz}'$ |
|---|---|---|---|---|---|
| -5.5 | -7.7 | -4.28 | 0 | 0 | 0 |

10
19
18B
SP4
SP3
16
18C
SP6
12
SP5
18A
SP2
SP1

SYSTEM AND METHOD FOR MEASURING STRESS IN A ROCK MASS

CROSS REFERENCE TO RELATED APPLICATIONS AND PRIORITY CLAIMS

The present application claims priority to U.S. provisional patent application No. 63/568,764 filed on Mar. 22, 2024 and incorporated herein by reference, to U.S. provisional patent application No. 63/667,747 filed on Jul. 4, 2024 and incorporated herein by reference, and to Canadian patent application no. 3,249,694 filed on Jul. 24, 2024 and incorporated herein by reference.

TECHNICAL FIELD

The disclosure relates generally to characterizing ground media, and more particularly to measuring stress in a rock mass.

BACKGROUND

The state of stress in a rock mass can be an important consideration in the design of underground construction projects. For example, the state of stress can be used to perform potential de-stress blasting to relieve stresses and microseismic activities prior to excavation to provide a safe underground workplace. It can also be used to design the layout of underground excavations to reduce the cost of construction and enhance the safety of the underground construction project. The state of stress in a rock mass can also be an important consideration in applications such as hydraulic fracturing using oil and gas wellbores, burying (e.g., nuclear) waste material, and drill cutting for example. Accurate information about the state of stress in a rock mass is desirable.

SUMMARY

In one aspect, the disclosure describes a method of measuring stress in a rock mass. The method comprises:

- inserting an expandable sleeve into a borehole extending into the rock mass;
- using a size of a test interval occupied by the sleeve inside the borehole, selecting an expansion flow rate and/or a contraction flow rate based on the size of the test interval;
- delivering a liquid to the sleeve to expand the sleeve while the sleeve is inside the borehole and to induce a fracture in the rock mass using the sleeve;
- after inducing the fracture in the rock mass, contracting the sleeve by removing the liquid from the sleeve to cause closing of the fracture, and performing at least one of the following:
- acquiring a fracture-closure pressure of the liquid that is indicative of the stress in the rock mass by, while contracting the sleeve: removing the liquid from the sleeve at the contraction flow rate selected based on the size of the test interval, and recording the fracture-closure pressure indicative of a pressure of the liquid inside the sleeve at a time coinciding with a closure of the fracture in the rock mass; and/or
- acquiring a fracture-reopening pressure of the liquid that is indicative of the stress in the rock mass by: expanding the sleeve by delivering the liquid to the sleeve at the expansion flow rate selected based on the size of the test interval to cause reopening of the fracture, and recording the fracture-reopening pressure indicative of the pressure of the liquid inside the sleeve at a time coinciding with the reopening of the fracture in the rock mass.

The method may comprise performing both the acquiring of the fracture-closure pressure and the acquiring of the fracture-reopening pressure.

Selecting the expansion flow rate and/or the contraction flow rate based on the size of the test interval may include: using a cross-sectional area of the borehole and an axial length of the sleeve along the borehole to determine a volume of the test interval; and selecting the expansion flow rate and/or the contraction flow rate based on the volume of the test interval.

A ratio of the volume of the test interval over the expansion flow rate may be between 2 minutes and 60 minutes. The ratio of the volume of the test interval over the expansion flow rate may be between 2 minutes and 30 minutes.

A ratio of the volume of the test interval over the contraction flow rate may be between 2 minutes and 60 minutes. The ratio of the volume of the test interval over the contraction flow rate may be between 5 minutes and 15 minutes.

The method may comprise selecting the expansion flow rate and the contraction flow rate based on the size of the test interval. The expansion flow rate and the contraction flow rate may have a same magnitude.

The method may comprise: acquiring the fracture-closure pressure; and while acquiring the fracture-closure pressure, removing the liquid from the sleeve at the contraction flow rate throughout a contraction time period extending from before the closure of the fracture to after the closure of the fracture.

The method may comprise: recording a contraction pressure indicative of the pressure of the liquid inside the sleeve during the contraction time period; and determining a relationship between the contraction pressure and a function of time, the fracture-closure pressure corresponding to a transition between a linear portion of the relationship to a non-linear portion of the relationship.

The function of time may be a G-function of time or a square root of time.

The method may comprise: acquiring the fracture-reopening pressure; and while acquiring the fracture-reopening pressure, delivering the liquid to the sleeve at the expansion flow rate throughout an expansion time period extending from before the reopening of the fracture to after the reopening of the fracture.

The method may comprise: recording an expansion pressure indicative of the pressure of the liquid inside the sleeve during the expansion time period; and determining a relationship between the expansion pressure and a function of time, the fracture-reopening pressure corresponding to a transition between a linear portion of the relationship to a non-linear portion of the relationship.

The function of time may be a G-function of time or a square root of time.

The method may comprise inserting a split tubular casing between the sleeve and a wall of the borehole to influence an angular position of the fracture about the borehole. The tubular casing may be split longitudinally into a first casing portion and a second casing portion movable relative to each other.

The tubular casing may be split longitudinally into the first casing portion, the second casing portion, a third casing portion and a fourth casing portion movable relative to each other.

The sleeve may include a packer operable to record an angular position of the fracture about the borehole.

The borehole may extend into the rock mass from an underground excavation. The expandable sleeve may be inserted into the borehole from the underground excavation.

The borehole may extend into the rock mass from a ground surface above the rock mass. The expandable sleeve is inserted into the borehole from the ground surface.

Embodiments may include combinations of the above features.

In a further aspect, the disclosure describes a method of determining one or more stresses in a rock mass. The method comprises:

for each of two or more boreholes having different orientations and extending into the rock mass:

inserting an expandable sleeve into the borehole;

delivering a liquid to the sleeve to expand the sleeve while the sleeve is inside the borehole to induce a fracture in the rock mass using the sleeve;

after inducing the fracture in the rock mass, contracting the sleeve by removing the liquid from the sleeve to cause closing of the fracture, and performing at least one of the following:

acquiring a fracture-closure pressure of the liquid that is indicative of the stress in the rock mass by, while contracting the sleeve, recording the fracture-closure pressure indicative of a pressure of the liquid inside the sleeve at a time coinciding with a closure of the fracture in the rock mass; and/or acquiring a fracture-reopening pressure of the liquid that is indicative of the stress in the rock mass by: expanding the sleeve by delivering the liquid to the sleeve to cause reopening of the fracture, and recording the fracture-reopening pressure indicative of the pressure of the liquid inside the sleeve at a time coinciding with the reopening of the fracture in the rock mass; and using the fracture-closure pressures and/or the fracture-reopening pressures, determining the one or more stresses in the rock mass.

The two or more boreholes may include three boreholes having different orientations and extending into the rock mass from an underground excavation.

The one or more stresses in the rock mass may include three principal stresses having three respective directions. When the three respective directions are known prior to acquiring the fracture-closure pressure and/or acquiring the fracture-reopening pressure, the two or more boreholes may include a borehole along each of the three respective directions. Determining the one or more stresses in the rock mass may include determining respective magnitudes of the three principal stresses.

The one or more stresses in the rock mass may include three principal stresses having three respective directions. The method may include, when the three respective directions are unknown prior to acquiring the fracture-closure pressure and/or acquiring a fracture-reopening pressure, determining the three respective directions and three respective magnitudes of the three principal stresses.

The method may comprise: inserting a split tubular casing between the sleeve and a wall of the borehole to influence a position of the fracture in the rock mass, the tubular casing being split longitudinally into a first casing portion and a second casing portion movable relative to each other; acquiring the fracture-closure pressure and/or acquiring the fracture-reopening pressure for six fractures having six different positions in the rock mass; and using the fracture-closure pressure and/or the fracture-reopening pressure for the six fractures, determining a stress tensor for the rock mass.

A first and a second of the six fractures may be in a first of the two or more boreholes. A third and a fourth of the six fractures may be in a second of the two or more boreholes. A fifth and a sixth of the six fractures may be in a third of the two or more boreholes.

The method may comprise: using the fracture-closure pressure and/or the fracture-reopening pressure for the six fractures, determining a tangential stress associated with each of the six fractures; and using a trend of each borehole, a plunge of each borehole, the orientation of the tubular casing for each of the six fractures, and the tangential stress associated with each of the six fractures to determine a stress tensor.

The method may comprise selecting a flow rate as a function of a size of a test interval occupied by the sleeve inside the borehole. Removing the liquid from the sleeve to cause closing of the fracture may includes removing the liquid at the flow rate. Delivering the liquid to the sleeve to cause opening of the fracture may include delivering the liquid at the flow rate.

The method may include performing both the acquiring of the fracture-closure pressure and the acquiring of the fracture-reopening pressure.

Selecting the flow rate may include: using a cross-sectional area of the borehole and an axial length of the sleeve along the borehole to determine a volume of the test interval; and selecting the flow rate based on the volume of the test interval.

A ratio of the volume of the test interval over the flow rate may be between 2 minutes and 60 minutes. A ratio of the volume of the test interval over the flow rate may be between 2 minutes and 30 minutes. A ratio of the volume of the test interval over the flow rate may be between 5 minutes and 15 minutes.

The split tubular casing may be split longitudinally into the first casing portion, the second casing portion, a third casing portion and a fourth casing portion movable relative to each other.

The sleeve may include a packer operable to record an angular position of the fracture about the borehole.

The borehole may extend into the rock mass from an underground excavation. The expandable sleeve may be inserted into the boreholes from the underground excavation.

The boreholes may extend into the rock mass from a ground surface above the rock mass. The expandable sleeve may be inserted into the boreholes from the ground surface.

Embodiments may include combinations of the above features.

In a further aspect, the disclosure describes a system for measuring stress in a rock mass. The system comprises:

an expandable sleeve insertable into a borehole formed in the rock mass and operable to apply a radially outward force against a wall of the borehole by expansion of the sleeve;

a positive displacement pump operatively connected to the sleeve, the positive displacement pump being operable to deliver a liquid to the sleeve at a constant flow rate throughout at least a majority of an expansion of the sleeve;

- a pressure sensor operable to measure a pressure of the liquid; and a pressure recorder operatively connected to the pressure sensor for recording the pressure of the liquid.

The positive displacement pump may be operable to remove the liquid from the sleeve at the constant flow rate throughout at least a majority of a contraction of the sleeve.

The positive displacement pump may be a piston pump driven by an electric motor.

The piston pump may include a piston translatable inside a cylinder defining a chamber for the liquid. The chamber may be in fluid communication with the sleeve. The electric motor may be drivingly connected to the piston via a leadscrew.

The electric motor may be drivingly connected to the piston via a speed-reducing gear train.

The electric motor may be a servo motor.

The system may comprise a split tubular casing for inserting between the sleeve and a wall of the borehole. The tubular casing may be split longitudinally into a first casing portion and a second casing portion movable relative to each other.

The sleeve may include a packer operable to record an angular position of a fracture about the borehole.

Embodiments may include combinations of the above features.

In a further aspect, the disclosure describes a sleeve fracturing tool for inducing a fracture in a wall of a borehole formed in a rock mass and influencing an angular position of the fracture about the borehole. The sleeve fracturing tool comprises:

- an expandable sleeve insertable into a borehole and operable to receive a liquid therein to cause radial expansion of the sleeve;
- a split tubular casing at least partially enclosing the sleeve and for positioning between the sleeve and the wall of the borehole to transfer a radially outward force to a wall of the borehole during expansion of the sleeve, the tubular casing being split longitudinally into a first casing portion and a second casing portion movable relative to each other; and
- a piston pump operable to deliver the liquid to the sleeve, the piston pump including a piston translatable inside a cylinder defining a chamber for the liquid, the chamber being in fluid communication with the sleeve, the piston pump including an electric motor is drivingly connected to the piston via a leadscrew and a speed-reducing gear train.

Embodiments may include combinations of the above features.

In a further aspect, the disclosure describes a method for determining a stress tensor defining a state of stress in a segment of rock mass. The method comprises:

- conducting six sleeve fracturing tests in the segment of rock mass, the six sleeve fracturing tests including three different borehole orientations;
- determining tangential stresses ($\sigma_{\theta 1}$-$\sigma_{\theta 6}$) respectively associated with the six sleeve fracturing tests; and
- determining the stress tensor using the tangential stresses ($\sigma_{\theta 1}$-$\sigma_{\theta 6}$).

The six sleeve fracturing tests may each have a trend ($T_i$-$T_n$) of the borehole orientation, a plunge ($P_i$-$P_n$) of the borehole orientation, a polar angle ($\theta_1$-$\theta_6$) of a location of a fracture about a borehole. The stress tensor may include: three normal stresses ($\sigma'_x$, $\sigma'_y$, $\sigma'_z$) in three orthogonal directions and three shear stresses ($\tau'_{xy}$, $\tau'_{xz}$, $\tau'_{yz}$) associated with the three orthogonal directions. Determining the stress tensor may include solving the following equation:

$$\begin{bmatrix} \sigma_{\theta 1} \\ \sigma_{\theta 2} \\ \sigma_{\theta 3} \\ \sigma_{\theta 4} \\ \sigma_{\theta 5} \\ \sigma_{\theta 6} \end{bmatrix} =$$

$$\left[\begin{array}{l} (1-\cos 2\theta_1)\cos^2 T_i + (1+\cos 2\theta_1)\sin^2 T_i \sin^2 P_i + 2\sin 2\theta_1 \sin 2T_i \sin P_i \\ (1-\cos 2\theta_2)\cos^2 T_j + (1+\cos 2\theta_2)\sin^2 T_j \sin^2 P_j + 2\sin 2\theta_2 \sin 2T_j \sin P_j \\ (1-\cos 2\theta_3)\cos^2 T_k + (1+\cos 2\theta_3)\sin^2 T_k \sin^2 P_k + 2\sin 2\theta_3 \sin 2T_k \sin P_k \\ (1-\cos 2\theta_4)\cos^2 T_l + (1+\cos 2\theta_4)\sin^2 T_l \sin^2 P_l + 2\sin 2\theta_4 \sin 2T_l \sin P_l \\ (1-\cos 2\theta_5)\cos^2 T_m + (1+\cos 2\theta_5)\sin^2 T_m \sin^2 P_m + 2\sin 2\theta_5 \sin 2T_m \sin P_m \\ (1-\cos 2\theta_6)\cos^2 T_n + (1+\cos 2\theta_6)\sin^2 T_n \sin^2 P_n + 2\sin 2\theta_6 \sin 2T_n \sin P_n \end{array}\right.$$

$$\begin{array}{c} (1-\cos 2\theta_1)\sin^2 T_i + (1+\cos 2\theta_1)\cos^2 T_i \sin^2 P_i - 2\sin 2\theta_1 \sin 2T_i \sin P_i \\ (1-\cos 2\theta_2)\sin^2 T_j + (1+\cos 2\theta_2)\cos^2 T_j \sin^2 P_j - 2\sin 2\theta_2 \sin 2T_j \sin P_j \\ (1-\cos 2\theta_3)\sin^2 T_k + (1+\cos 2\theta_3)\cos^2 T_k \sin^2 P_k - 2\sin 2\theta_3 \sin 2T_k \sin P_k \\ (1-\cos 2\theta_4)\sin^2 T_l + (1+\cos 2\theta_4)\cos^2 T_l \sin^2 P_l - 2\sin 2\theta_4 \sin 2T_l \sin P_l \\ (1-\cos 2\theta_5)\sin^2 T_m + (1+\cos 2\theta_5)\cos^2 T_m \sin^2 P_m - 2\sin 2\theta_5 \sin 2T_m \sin P_m \\ (1-\cos 2\theta_6)\sin^2 T_n + (1+\cos 2\theta_6)\cos^2 T_n \sin^2 P_n - 2\sin 2\theta_6 \sin 2T_n \sin P_n \end{array}$$

$$\begin{array}{c} (1+\cos 2\theta_1)\cos^2 P_i - (1+\cos 2\theta_1)\sin 2T_i \sin^2 P_i - 4\sin 2\theta_1 \\ (1+\cos 2\theta_2)\cos^2 P_j - (1+\cos 2\theta_2)\sin 2T_j \sin^2 P_j - 4\sin 2\theta_2 \\ (1+\cos 2\theta_3)\cos^2 P_k - (1+\cos 2\theta_3)\sin 2T_k \sin^2 P_k - 4\sin 2\theta_3 \\ (1+\cos 2\theta_4)\cos^2 P_l - (1+\cos 2\theta_4)\sin 2T_l \sin^2 P_l - 4\sin 2\theta_4 \\ (1+\cos 2\theta_5)\cos^2 P_m - (1+\cos 2\theta_5)\sin 2T_m \sin^2 P_m - 4\sin 2\theta_5 \\ (1+\cos 2\theta_6)\cos^2 P_n - (1+\cos 2\theta_6)\sin 2T_n \sin^2 P_n - 4\sin 2\theta_6 \end{array}$$

$$\begin{array}{c} \left(\cos^2 T_i \sin P_i - \sin^2 T_i \sin P_i\right) + (1-\cos 2\theta_1)\sin 2T_i - \\ \left(\cos^2 T_j \sin P_j - \sin^2 T_j \sin P_j\right) + (1-\cos 2\theta_2)\sin 2T_j - \\ \left(\cos^2 T_k \sin P_k - \sin^2 T_k \sin P_k\right) + (1-\cos 2\theta_3)\sin 2T_k - \\ \left(\cos^2 T_l \sin P_l - \sin^2 T_l \sin P_l\right) + (1-\cos 2\theta_4)\sin 2T_l - \\ \left(\cos^2 T_m \sin P_m - \sin^2 T_m \sin P_m\right) + (1-\cos 2\theta_5)\sin 2T_m - \\ \left(\cos^2 T_n \sin P_n - \sin^2 T_n \sin P_n\right) + (1-\cos 2\theta_6)\sin 2T_n - \end{array}$$

$$\begin{array}{c} 4\sin 2\theta_1 \cos T_i \cos P_i - 2(\sin T_i \cos P_i \sin P_i)(1+\cos 2\theta_1)2(1+\cos 2\theta_1) \\ 4\sin 2\theta_2 \cos T_j \cos P_j - 2(\sin T_j \cos P_j \sin P_j)(1+\cos 2\theta_2)2(1+\cos 2\theta_2) \\ 4\sin 2\theta_3 \cos T_k \cos P_k - 2(\sin T_k \cos P_k \sin P_k)(1+\cos 2\theta_3)2(1+\cos 2\theta_3) \\ 4\sin 2\theta_4 \cos T_l \cos P_l - 2(\sin T_l \cos P_l \sin P_l)(1+\cos 2\theta_4)2(1+\cos 2\theta_4) \\ 4\sin 2\theta_5 \cos T_m \cos P_m - 2(\sin T_m \cos P_m \sin P_m)(1+\cos 2\theta_5)2(1+\cos 2\theta_5) \\ 4\sin 2\theta_6 \cos T_n \cos P_n - 2(\sin T_n \cos P_n \sin P_n)(1+\cos 2\theta_6)2(1+\cos 2\theta_6) \end{array}$$

$$\left.\begin{array}{c} \cos T_i \cos P_i \sin P_i - 4\sin 2\theta_1 \sin T_i \cos P_i \\ \cos T_j \cos P_j \sin P_j - 4\sin 2\theta_2 \sin T_j \cos P_j \\ \cos T_k \cos P_k \sin P_k - 4\sin 2\theta_3 \sin T_k \cos P_k \\ \cos T_l \cos P_l \sin P_l - 4\sin 2\theta_4 \sin T_l \cos P_l \\ \cos T_m \cos P_m \sin P_m - 4\sin 2\theta_5 \sin T_m \cos P_m \\ \cos T_n \cos P_n \sin P_n - 4\sin 2\theta_6 \sin T_n \cos P_n \end{array}\right] \begin{bmatrix} \sigma'_x \\ \sigma'_y \\ \sigma'_z \\ \tau'_{xy} \\ \tau'_{xz} \\ \tau'_{yz} \end{bmatrix}.$$

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 6 is a table defining fluid flow rates for use with the expandable sleeve and applicable for different sizes of a test interval occupied by the expandable sleeve;

FIG. 8B is a transverse cross-sectional view of the expandable sleeve together with the split tubular casing of FIG. 8A inside the borehole;

FIG. 11 is a flow diagram of an exemplary method for determining stresses in a rock mass;

FIGS. 15A-15C illustrate reference geometry used to compute the stress tensor;

DETAILED DESCRIPTION

This disclosure describes systems and methods useful for measuring stress in a rock mass using sleeve fracturing. Sleeve fracturing is a technique for inducing borehole fractures in a rock mass using an expandable sleeve without direct fluid interaction with existing fractures and joints, or other geological structures in the rock mass. In some embodiments, the systems and methods described herein may facilitate the measurement of the stress(es) in the rock mass with improved accuracy concerning stress magnitude and/or stress direction. In some embodiments, the methods and systems described herein may facilitate the determination of the magnitude(s) and/or direction(s) of in-situ principal stresses in the rock mass through the use of one or more boreholes. For example, the methods and systems described herein may facilitate the determination of a complete stress tensor for a segment of the rock mass. In some embodiments, the systems described herein may facilitate the delivery of a liquid to the expandable sleeve during sleeve fracturing at a (e.g., constant) flow rate that is selected based on the size of a test interval occupied by the sleeve inside the borehole to promote improved accuracy in the stress measurement and make the system and method usable in many rock environments including hard rock mines.

Aspects of various embodiments are described through reference to the drawings. The term "connected" may include both direct connection (in which two elements that are connected to each other contact each other) and indirect connection (in which at least one additional element is located between the two elements). The term "substantially" as used herein may be applied to modify any quantitative representation which could permissibly vary without resulting in a change in the basic function to which it is related.

Figure 1:
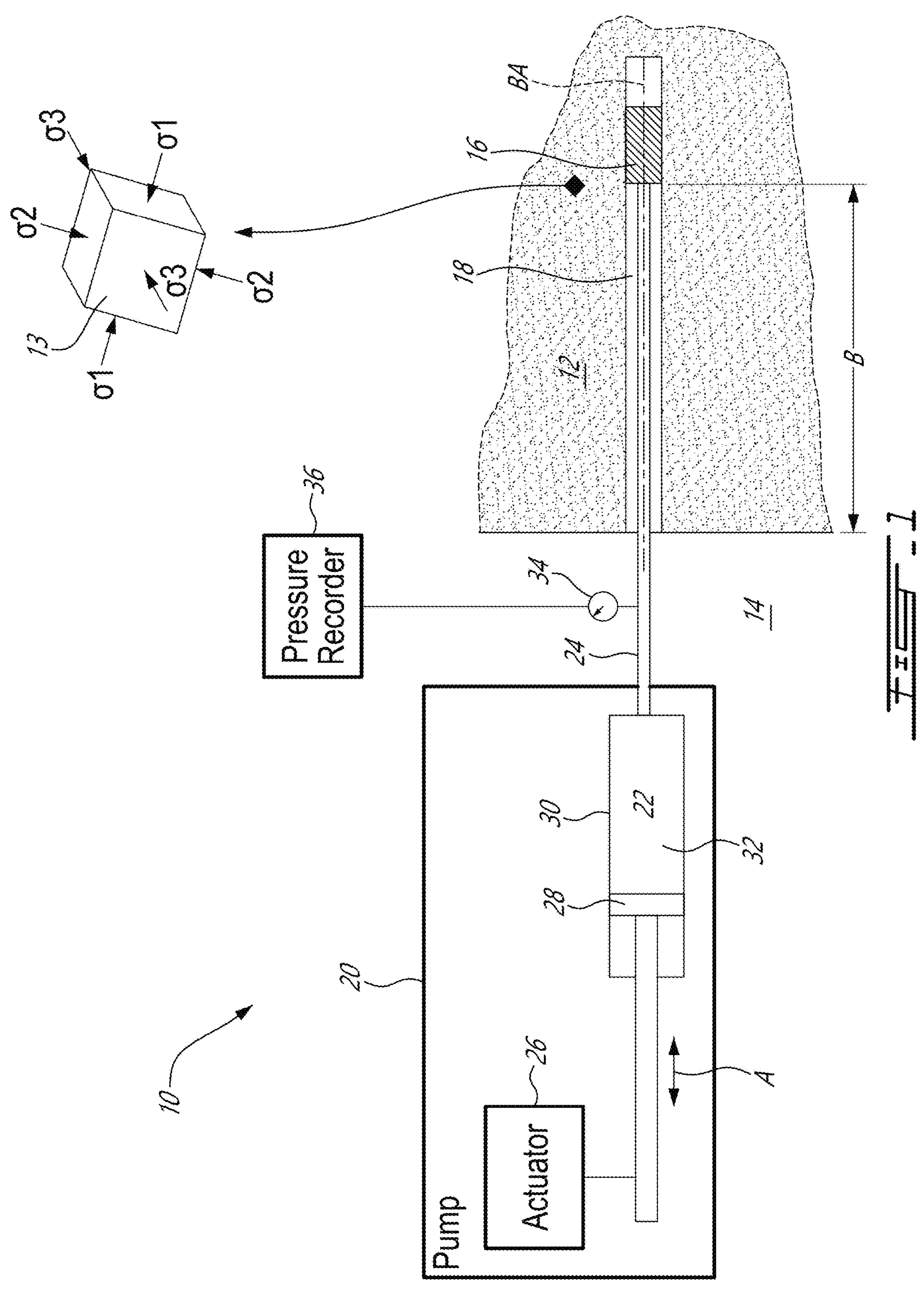
FIG. 1 is a schematic illustration of an exemplary system for measuring stress in a rock mass using sleeve fracturing from an underground excavation.

FIG. 1 is a schematic illustration of an exemplary system 10 for measuring stress in rock mass 12 using sleeve fracturing. System 10 may be used to acquire measurements useful for determining the state of stress in rock mass 12. For example, system 10 may be used to acquire measurements useful for determining the magnitudes and optionally also the directions of in-situ principal stresses $\sigma\mathbf{1}$, $\sigma\mathbf{2}$ and $\sigma\mathbf{3}$ in rock mass 12. System 10 may be used to acquire measurements useful for determining a complete stress tensor associated with rock mass 12. In reference to representative volume 13 shown in FIG. 1, principal stresses $\sigma\mathbf{1}$, $\sigma\mathbf{2}$ and $\sigma\mathbf{3}$ are shown to have a compressive state and are respectively oriented along orthogonal principal directions selected so that there is no shear stress component in rock mass 12. As referenced herein, maximum principal stress $\sigma\mathbf{1}$ may have the highest magnitude of the three principal stresses $\sigma\mathbf{1}$, $\sigma\mathbf{2}$ and $\sigma\mathbf{3}$, minimum principal stress $\sigma\mathbf{3}$ may have the lowest magnitude, and intermediate principal stress $\sigma\mathbf{2}$ may have a magnitude that is between the magnitudes of maximum principal stress $\sigma\mathbf{1}$ and minimum principal stress $\sigma\mathbf{3}$.

Figure 19:
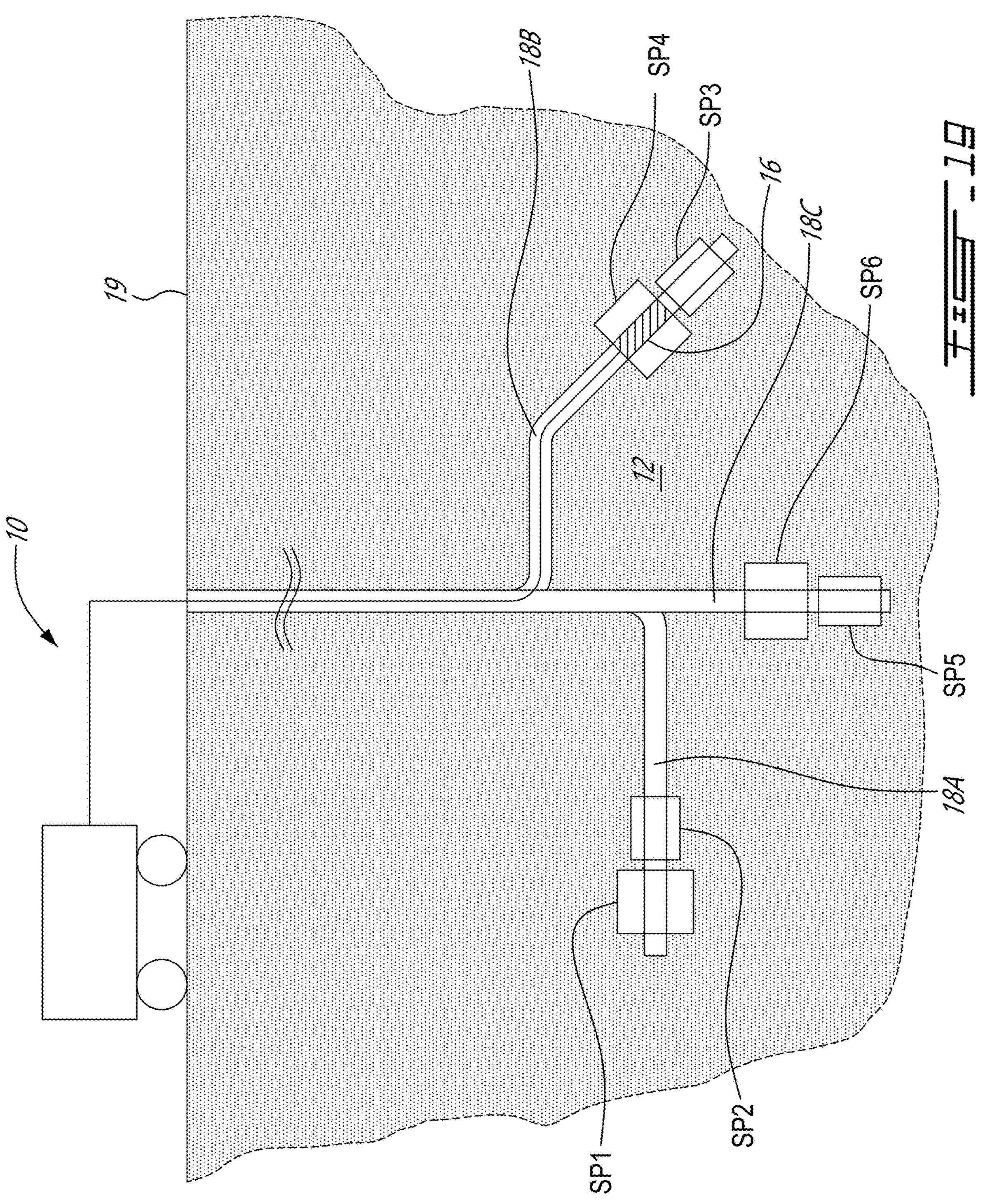
FIG. 19 is a schematic illustration of an exemplary system for measuring stress in a rock mass using sleeve fracturing from a ground surface.

System 10 may include one or more expandable sleeves 16 (referred hereinafter in the singular as "sleeve 16") insertable into borehole 18 formed (i.e., drilled) in rock mass 12 and operable to apply a radially outward force against a wall (i.e., perimeter) of borehole 18 by expansion (e.g., inflation) of sleeve 16. Borehole 18 may extend along a longitudinal borehole axis BA. FIG. 1 shows a cross-section of rock mass 12 in a plane that includes borehole axis BA. Borehole 18 may have a cylindrical shape. Borehole 18 may have a substantially circular cross-sectional profile. Borehole 18 may have a (e.g., axially uniform) diameter D (shown in FIG. 2) of between 1 cm and 30 cm for example. Borehole 18 may extend linearly from underground excavation 14, which may be a tunnel. In some embodiments, borehole 18 may extend along a curved path from underground excavation 14. Underground excavation 14 may be a tunnel that is accessible by a human operator of system 10. In some embodiments, borehole 18 may extend downwardly from ground surface 19 as shown in FIG. 19 for example, and may be substantially straight and/or curved (e.g., deviated).

Sleeve 16 may be of a type known as an inflatable packer that is radially expandable by injecting a pressurized fluid inside sleeve 16. Sleeve 16 may include a cylindrical elastic membrane that is sealed at both axial ends and that inflates radially outward when internally pressurized by a fluid. The membrane may be made from a rubber tube, a fabric and wire reinforced rubber element, steel braided rubber element, or a relatively thin metal sheath depending on the pressure rating of sleeve 16.

In some embodiments, sleeve 16 may optionally be an inflatable impression packer having a sidewall made of memory retention material (e.g., rubber) that contacts the wall of borehole 18 and imprints the details (e.g., surface topography) of the wall of borehole 18. When the impression packer is used as sleeve 16 for sleeve fracture testing, the outer surface of the impression packer may retain an imprint of the fracture induced in borehole 18 after the impression packer is deflated and withdrawn from borehole 18. In other words, the impression packer may record a presence and a (e.g., angular) position of fracture 48 inside borehole 18. A visual inspection of the outer surface of the impression packer together with the known orientation of the impression packer in borehole 18 during sleeve fracture testing may be used to determine the angular position of fracture 48 about borehole 18.

In embodiments where sleeve 16 is not an impression packer, the position of the induced fracture inside borehole 18 may be acquired by visual inspection of the wall of borehole 18 after removal of sleeve 16 from borehole 18 using a borehole imaging tool for example.

In some embodiments, sleeve 16 may be part of an instrumented packer that is equipped with one or more instruments such as strain gauges that facilitate the measurement of the deformation of sleeve 16. Such instruments may measure the amount and rate of volume change of sleeve 16, and may also measure the angular position of fracture 48. For example, strain gauges coupled to sleeve 16 may be oriented and configured to record a presence and a (e.g., angular) position of fracture 48 induced inside borehole 18.

System 10 may include pump 20 that may be used to deliver liquid 22 to sleeve 16 to cause expansion of sleeve 16, and/or to remove liquid 22 from sleeve 16 to cause contraction of sleeve 16 during sleeve fracture testing. An interior of sleeve 16 may be in fluid communication with pump 20 via conduit 24 (e.g., hose, tube). Liquid 22 may be substantially incompressible. In various embodiments, liquid 22 may be water or oil for example. Pump 20 may be a positive displacement pump operatively connected to sleeve 16. In various embodiments, pump 20 may include a syringe (i.e., piston) pump as shown in FIG. 1, a gear pump or a vane pump for example. Pump 20 may be driven by actuator 26. Pump 20 may include piston 28 translatable inside cylinder 30. Cylinder 30 may define chamber 32 for receiving liquid 22 therein. Piston 28 may be movable in a reciprocating manner along arrow A to either deliver liquid 22 to sleeve 16 via conduit 24 to expand sleeve 16, or to draw (remove) liquid 22 from sleeve 16 via conduit 24 to contract sleeve 16. Actuator 26 may be drivingly connected to piston 28 via one or more gears, a lead screw mechanism, a rack-and-pinion mechanism and/or other suitable mechanism for transmitting motive power from actuator 26 to piston 28. In some embodiments, the mechanism connecting actuator 26 to piston 28 may provide a mechanical advantage and/or an operating speed reduction to promote an accuracy of pump 20 in delivering or removing the desired flow rate of liquid 22 to/from sleeve 16.

Pump 20 may be operable to maintain a substantially constant operating speed and consequently maintain a substantially constant flow rate of liquid 22 at a desired set point to/from sleeve 16. In some embodiments, the operating speed of pump 20 may be adjustable. In some embodiments, the operating speed of pump 20 may be fixed (i.e., non-adjustable) to an operating speed suitable to perform stress measurements within a range of physical and/or operating parameters of system 10.

In some embodiments, pump 20 may be operable to maintain delivery and/or withdrawal of liquid 22 at a substantially constant flow rate for a desired time duration. In some embodiments and/or operating conditions, pump 20 may be operable to maintain a substantially constant flow rate within a tolerance of about ±0.005%. In some embodiments and/or operating conditions, pump 20 may be operable to maintain a substantially constant flow rate within a tolerance of about ±1%. In some embodiments, pump 20 may have an auto-tuning function to ensure that actuator 26 is functioning optimally for the mechanical arrangement of pump 20 and the load conditions. In some embodiments, pump 20 may be operable to maintain a desired flow rate substantially an entire stroke length of piston 28. In some embodiments, pump 20 may be operable to maintain a desired flow rate for only part (e.g., a majority) of the stroke length of piston 28 corresponding to a time window during which one or more meaningful pressure measurements are expected to be acquired.

Pressure measurements of liquid 22 acquired during the expansion and/or the contraction of sleeve 16 may be indicative of the state of stress in rock mass 12. The hydraulic system including chamber 32, conduit 24 and sleeve 16 may be bled to remove air from the hydraulic system and promote linearity in the pressure-volume relationship, and thereby promote an accurate detection of pressure-sensitive events that are indicative of the stress(es) in rock mass 12. The pressure measurements acquired may subsequently be converted to one or more stress magnitudes and optionally directions as explained below.

The pressure measurements may be acquired using one or more pressure sensors 34 (referred hereinafter in the singular). Pressure sensor 34 may be operable to sense a pressure of liquid 22 either inside of chamber 32, inside of conduit 24 or inside of sleeve 16. Accordingly, the pressure measurements acquired with pressure sensor 34 may be indicative of (i.e., related to) the pressure of liquid 22 that is inside of sleeve 16. Pressure sensor 34 may be of any type suitable for outputting one or more analog or digital signals that may be transmitted to pressure recorder 36 for the purpose of logging the measured pressures of liquid 22 with respect to time. In some embodiments, pressure sensor 34 may be a piezoelectric pressure sensor or a capacitive pressure sensor for example.

Pressure sensor 34 may be operatively connected to (i.e., in data communication with) pressure recorder 36. Pressure recorder 36 may include suitable data acquisition equipment including an electronic device (e.g., computer) such as a data logger capable of recording pressure measurements acquired via pressure sensor 34 over time during operation of system 10. Pressure recorder 36 may include a data processor and machine readable memory capable of storing the pressure measurements for real-time and/or offline (i.e., future) processing/analysis.

In some embodiments, borehole 18 may be drilled to a sufficient depth from underground excavation 14 so that sleeve 16 may be inserted at least to distance B and that cylindrical test interval 17 occupied by sleeve 16 and defined by an expandable axial length L (shown in FIG. 2) of sleeve 16 may be outside of a zone in which stresses in rock mass 12 may be influenced by the presence of underground excavation 14. In some situations, distance B may be equal to or greater than three times the span (e.g., diameter) of underground excavation 14 parallel to the direction of borehole 18. For example, if borehole 18 is vertical, distance B may be three times the height of excavation 14. If borehole 18 is horizontal, distance B may be three times the width of excavation 14. The methods and systems described herein may however also be used with shorter boreholes 18 where test interval 17 is within the zone of influence. In such situations, the influence (e.g., stress concentration) on the stresses in rock mass 12 due to the presence of underground excavation 14 may be taken into account in the calculation of the principal stresses $\sigma$1, $\sigma$2, $\sigma$3 for example.

When sleeve fracturing is performed from underground excavation 14 as shown in FIG. 1, elements of system 10 such as pump 20, pressure sensor 34 and pressure recorder 36 may be disposed outside of borehole 18 and inside underground excavation 14. However, some elements of system 10 such as pump 20 and/or pressure sensor 34 may be configured to be inserted into borehole 18 to accommodate situations where sleeve 16 is inserted relatively deeply inside a long borehole 18 to permit pump 20 to be in relatively close proximity to sleeve 16. In various embodiments, system 10 may be entirely or partially disposed inside of borehole 18.

Figure 2:
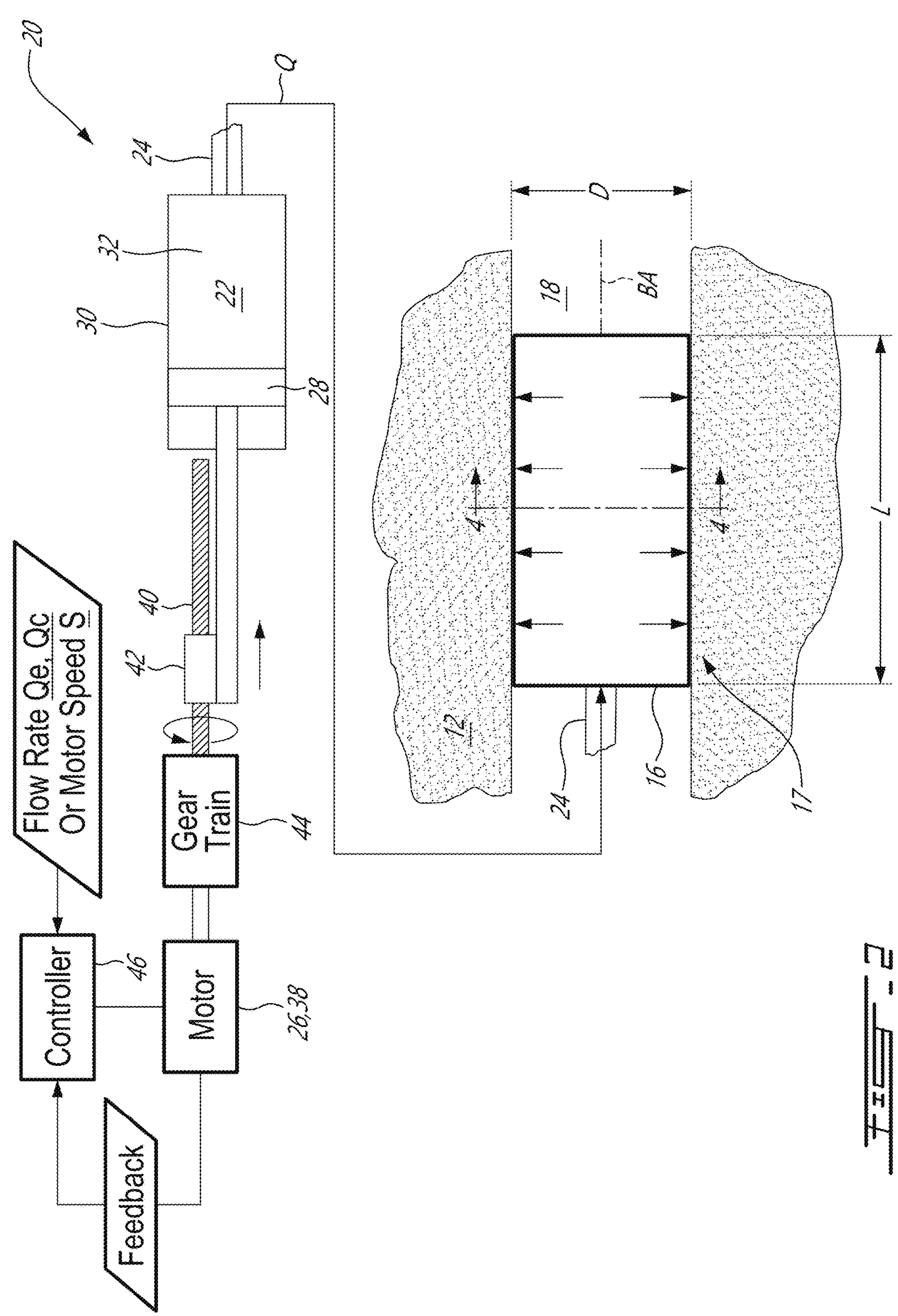
FIG. 2 is a schematic illustration of an exemplary pump of the system of FIG. 1 together with an enlarged view of an expandable sleeve of the system of FIG. 1.

FIG. 2 is a schematic illustration of part of system 10 including details of an exemplary pump 20 together with an enlarged view of sleeve 16 disposed inside of borehole 18. Pump 20 may include electric motor 38 that serves as actuator 26 for driving piston 28 inside of cylinder 30. Motor 38 may be drivingly connected to piston 28 via lead screw 40 and nut 42. The rotation of lead screw 40 may be driven by motor 38. Nut 42 may be connected to piston 28 so as to be translatable with piston 28 and threadably engaged with lead screw 40. Accordingly, the rotation of lead screw 40 in one direction may cause nut 42 and piston 28 to move in the right direction to push liquid 22 out of chamber 32 and into sleeve 16. The rotation of lead screw 40 in the opposite direction may cause nut 42 and piston 28 to move in the left direction to remove liquid 22 from sleeve 16 and receive the liquid 22 into chamber 32. In other words, lead screw 40 and nut 42 may cooperatively convert rotary motion output from motor 38 into the linear motion of piston 28.

In some embodiments, motor 38 may be drivingly connected to lead screw 40 via an optional gear train 44. In some embodiments, gear train 44 may include a speed-reducing gear train and may increase the accuracy of pump 20 in achieving a desired expansion flow rate Qe and/or contraction flow rate Qc by allowing motor 38 to operate at a higher and potentially more stable rotational speed.

Pump 20 may include controller 46 operable to control an operation of motor 38. For example, the desired flow rate Qe, Qc (or equivalent motor speed(s) S) may be provided as a set point to controller 46. Controller 46 may then control the operation of motor 38 to maintain flow rate Qe, Qc substantially constant for a desired duration. In some embodiments, motor speed S (e.g., in revolutions per minute) of motor 38 may be controlled using a suitable closed loop (i.e., feedback) control algorithm that is implemented with controller 46, and sensed feedback. In some embodiments, motor 38 may be a servo motor. In some embodiments, motor 38 may be a stepper motor.

FIG. 2 illustrates a situation where sleeve 16 is being expanded due to the movement of piston 28 in the right direction to push liquid 22 out of chamber 32 and into sleeve 16. However, pump 20 may be operable to instead draw liquid 22 out of sleeve 16 and back into chamber 32 by the movement of piston 28 in the left direction and thereby cause sleeve 16 to contract. In some embodiments, the rotation of motor 38 may be reversible so that the same motor 38 may be used to selectively drive piston 28 in the right or in the left directions. In other words, motor 38 may be bidirectional. Alternatively, separate unidirectional motors may be selectively operable to drive piston 28 in the right and left directions respectively, or motor 38 may be unidirectional and gear train 44 may be operable to selectively reverse the direction of rotation output from motor 38 to permit the single unidirectional motor 38 to drive piston 28 in both directions.

Figure 3:
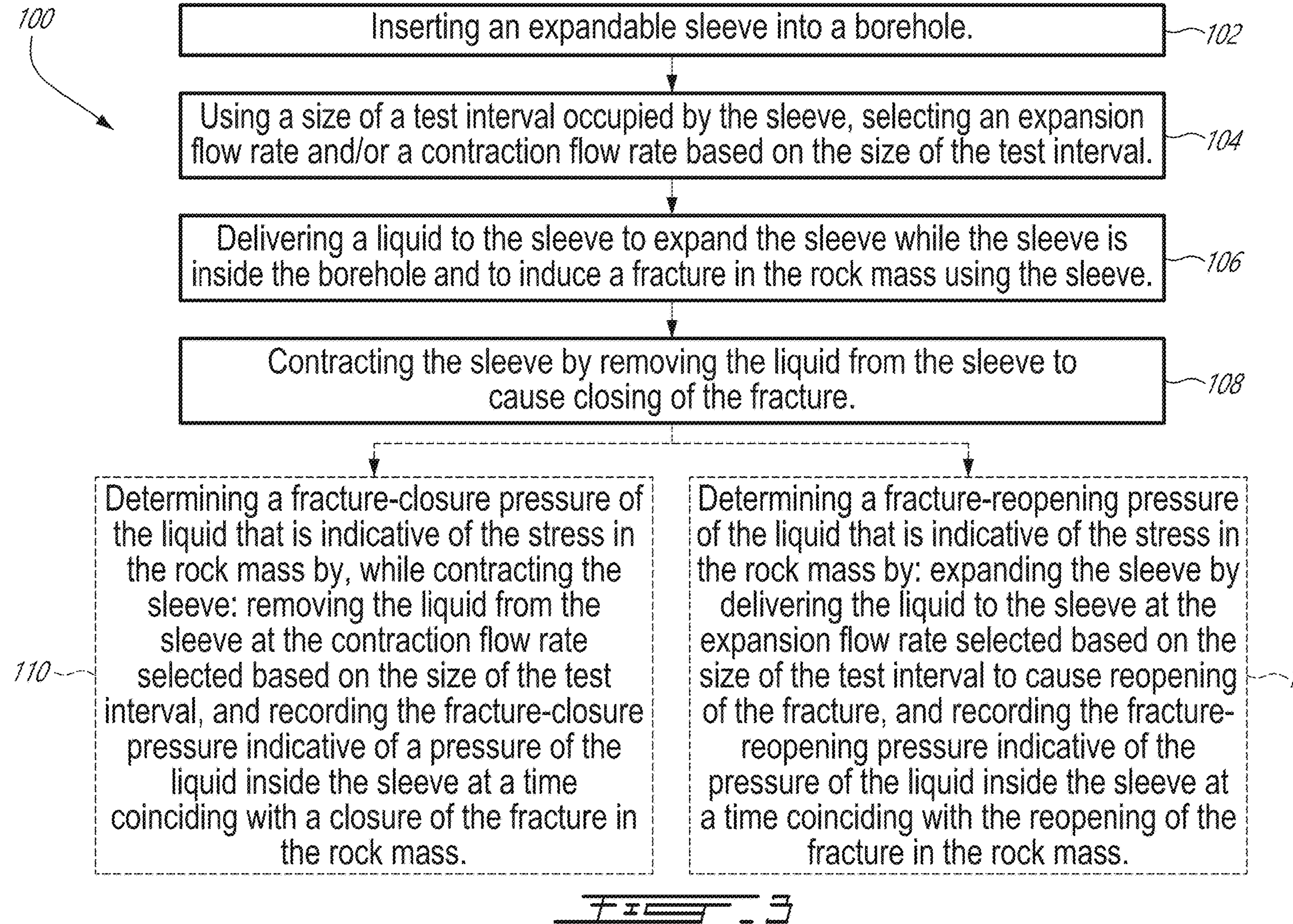
FIG. 3 is a flow diagram of an exemplary method of measuring stress in a rock mass.

FIG. 3 is a flow diagram of an exemplary method 100 of measuring stress in rock mass 12 from underground excavation 14 or from ground surface 19 as shown in FIG. 19. Method 100 may be performed using system 10 described herein or using another (e.g., sleeve fracturing) system. Aspects of method 100 may be combined with aspects of other methods described herein. Method 100 may include aspects of system 10. In various embodiments, method 100 may include:

- inserting expandable sleeve 16 into borehole 18 extending into rock mass 12 from underground excavation 14 or from ground surface 19 (block 102);
- using a size of test interval 17 occupied by sleeve 16 inside of borehole 18, selecting an expansion flow rate Qe and/or a contraction flow rate Qc based on the size of test interval 17 (block 104);
- delivering liquid 22 to sleeve 16 to expand sleeve 16 while sleeve 16 is inside borehole 18 and induce fracture 48 in rock mass 12 using sleeve 16 (block 106);
- after inducing fracture 48 in rock mass 12, contracting sleeve 16 by removing liquid 22 from sleeve 16 to cause closing of fracture 48 (block 108), and performing at least one of the following:
- determining fracture-closure pressure Pc (e.g., shown in FIGS. 9 and 10, also referenced in equation 1 below) of liquid 22 that is indicative of the stress in rock mass 12 by, while contracting sleeve 16: removing liquid 22 from sleeve 16 at contraction flow rate Qc selected based on the size of test interval 17, and recording fracture-closure pressure Pc indicative of a pressure of liquid 22 inside sleeve 16 at a time coinciding with a closure of fracture 48 in rock mass 12 (block 110); and/or
- determining fracture-reopening pressure Pr (referenced in equation 1 below) of liquid 22 that is indicative of the stress in rock mass 12 by: expanding sleeve 16 by delivering liquid 22 to sleeve 16 at expansion flow rate Qe selected based on the size of test interval 17 to cause reopening of the previously induced fracture 48, and recording the fracture-reopening pressure indicative of the pressure of liquid 22 inside sleeve 16 at a time coinciding with the reopening of fracture 48 in rock mass 12 (block 112).

Aspects of method 100 are described below in relation to the subsequent figures.

Figure 4:
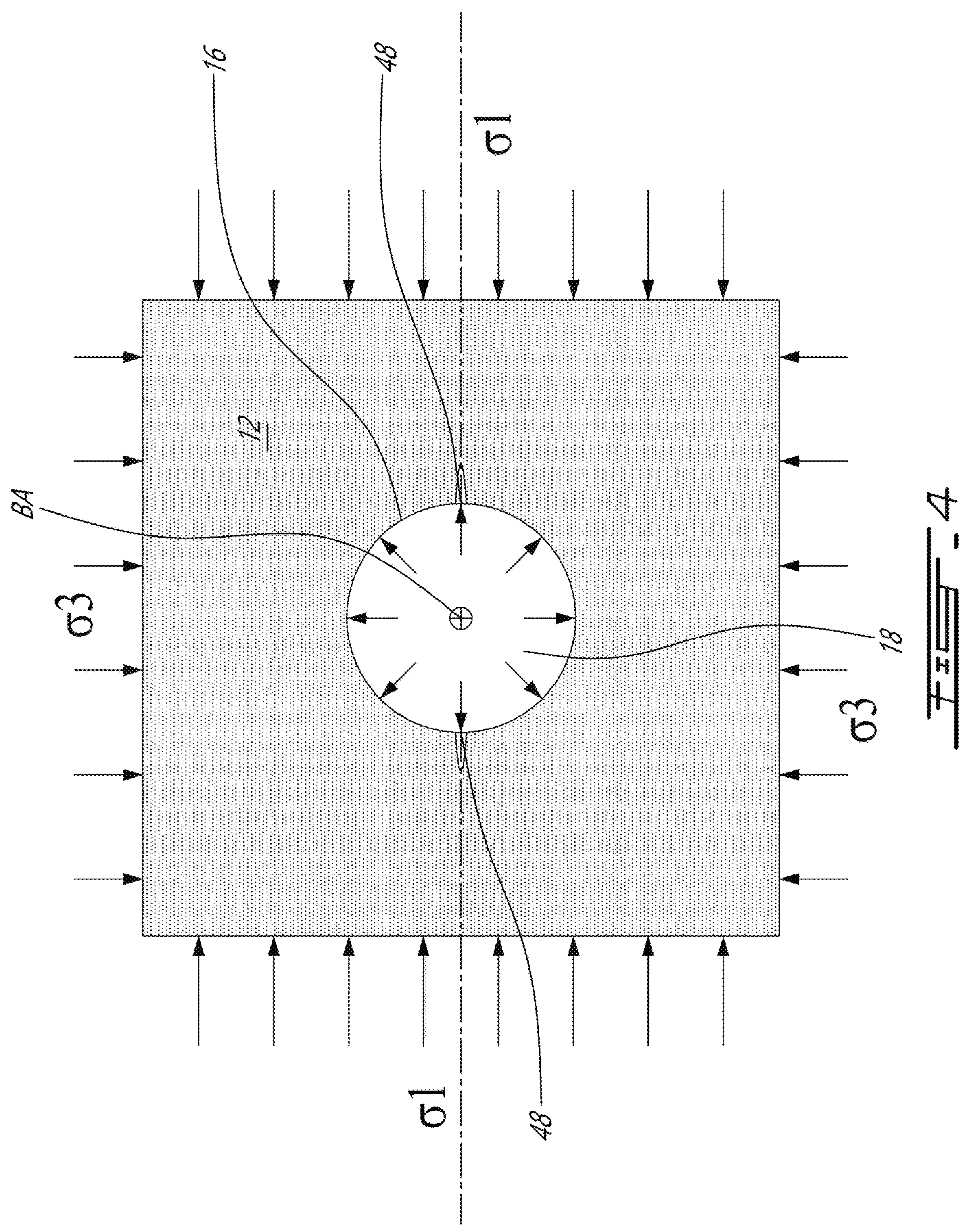
FIG. 4 is a transverse cross-sectional view of the expandable sleeve inside a borehole and taken along line 4-4 in FIG. 2.

FIG. 4 is a transverse cross-sectional view of sleeve 16 and rock mass 12 taken along line 4-4 in FIG. 2. In the scenario illustrated in FIG. 4, borehole 18 is oriented so that borehole axis BA is substantially parallel to intermediate principal stress σ2 for clarity. When liquid 22 is injected into sleeve 16, the outer cylindrical membrane of sleeve 16 radially expands against the wall of borehole 18 and applies a radially outward force against the wall of borehole 18. The injection of liquid 22 is maintained until the pressure of liquid 22 becomes large enough to induce one or more relatively small (e.g., micro) but detectable fractures 48 (referenced hereinafter in the singular) at the perimeter of borehole 18 and extending radially into rock mass 12 as shown schematically in FIG. 4. Fracture 48 may extend substantially axially along borehole 18 (e.g., along borehole axis BA). In some embodiments, the pressure of liquid 22 may optionally be further increased to induce additional fracture(s) in the wall of borehole 18.

Some embodiments of method 100 may include acquiring one or both of fracture-closure pressure Pc and fracture-reopening pressure Pr. For example, in some embodiments, method 100 may include a sole (i.e., only one) expansion/contraction cycle of sleeve 16 where fracture 48 is inducted during the expansion of sleeve 16, fracture-closure pressure Pc is recorded during the contraction of sleeve 16, and only fracture-closure pressure Pc is used to characterize a state of stress in rock mass 12. Alternatively, in some embodiments, method 100 may include one or more additional expansion/contraction cycles of sleeve 16 to reopen and reclose fracture 48 so that one or both of fracture-closure pressure Pc and fracture-reopening pressure Pr may be recorded and optionally both used to characterize the state of stress in rock mass 12. In some embodiments, multiple expansion/contraction cycles of sleeve 16 may be used to obtain multiple measurements and determine an average fracture-closure pressure Pc, an average fracture-reopening pressure Pr and/or combine measurements of both fracture-closure pressure Pc and fracture-reopening pressure Pr together.

During the initial expansion of sleeve 16, liquid 22 may be delivered to sleeve 16 at a substantially constant expansion flow rate Qe or at another flow rate until fracture 48 has been detected or until a desired threshold pressure has been reached, which may be slightly greater than a pressure at which fracture 48 is expected to be induced. The occurrence of fracture 48 may be detected by a sudden change (e.g., decrease or increase) in the pressure of liquid 22 and/or by an acoustic sensor (e.g., microphone) or optical sensor (e.g. optic fiber) that may be in proximity to sleeve 16. The threshold pressure may be selected based to the type of rock that is contained in rock mass 12, based on the depth of underground excavation 14, and/or based on the expected stress magnitude(s) in that region of rock mass 12. After fracture 48 has been induced, the delivery of liquid 22 to sleeve 16 may be stopped and then a controlled contraction of sleeve 16 may be performed by pump 20 removing liquid 22 from sleeve 16 at a substantially constant contraction flow rate Qc at least until fracture 48 has closed so that fracture-closure pressure Pc may be measured while liquid 22 is removed from sleeve 16 at contraction flow rate Qc. One or more additional cycles of controlled expansion and controlled contraction of sleeve 16 may optionally be performed using expansion flow rate Qe and contraction flow rate Qc respectively to cause reopening and reclosing of fracture 48 to obtain multiple measurements of and refine the measurements of fracture-closure pressure Pc and/or fracture-reopening pressure Pr.

Figure 5:
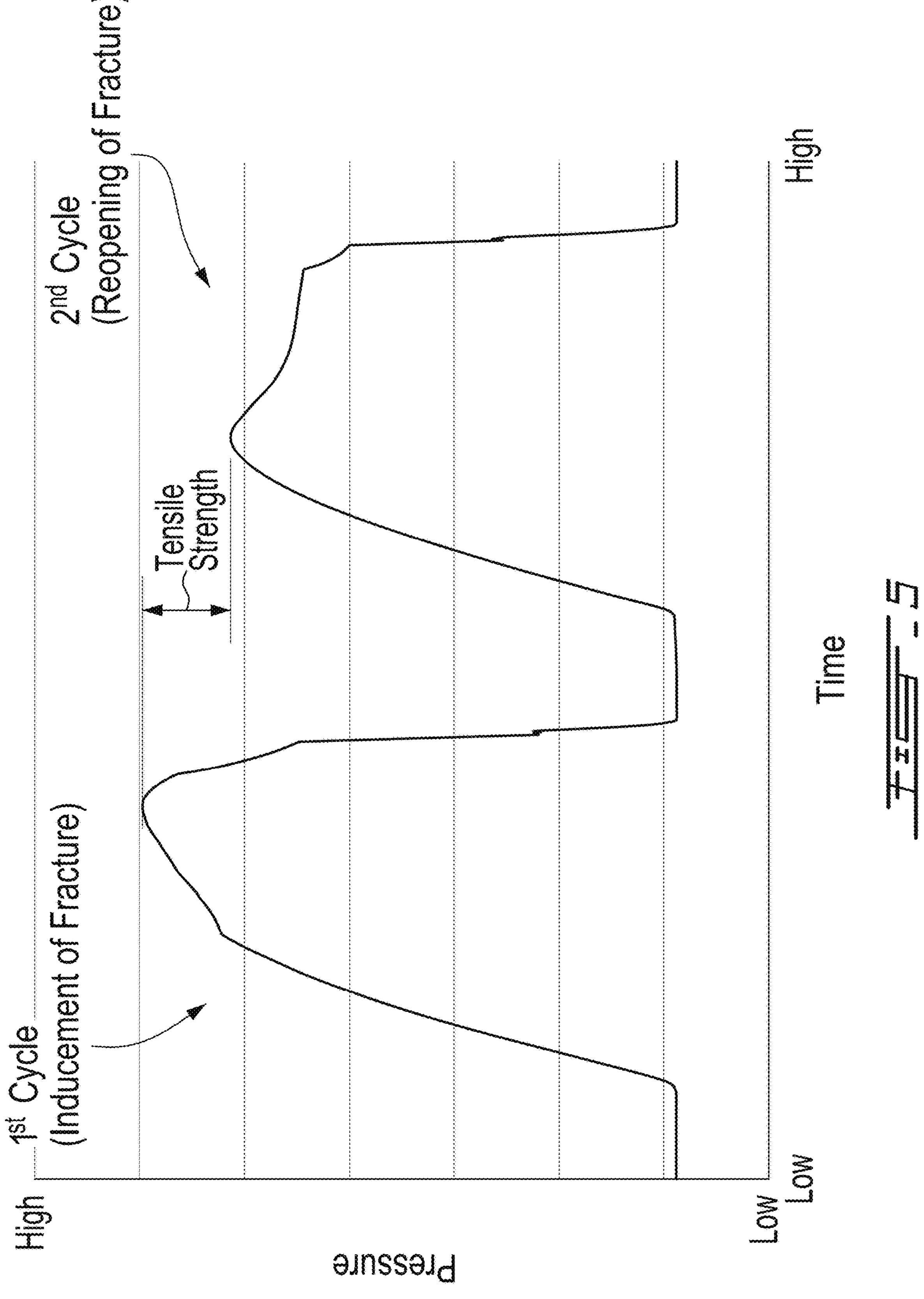
FIG. 5 is a plot showing an exemplary relationship between the pressure of a fluid used with the expandable sleeve and time during first and second expansion/contraction cycles of the expandable sleeve.

FIG. 5 is a plot showing an exemplary relationship between the pressure of liquid 22 used with sleeve 16 and time during two consecutive expansion/contraction cycles of sleeve 16. The first cycle may be used to initiate fracture 48 and the subsequent second cycle may be used to reopen fracture 48. In some embodiments, two or more expansion/contraction cycles of sleeve 16 may be used to obtain the tensile strength of the material of rock mass 12. For example, fracture-reopening cycle may be indicative of the tensile strength of the material of rock mass 12. An estimate of the tensile strength of the material of rock mass 12 in the target zone may substantially correspond to the difference between the peak pressure of the first cycle when fracture 48 is induced and the peak pressure of the subsequent second cycle when fracture 48 is reopened.

Once fracture-closure pressure Pc and/or fracture-reopening pressure Pr measurement(s) is/are recorded, since liquid 22 used during sleeve fracturing is contained and does not seep into rock mass 12, and based on the assumption of isotropic elastic properties of rock mass 12, fracture-closure pressure Pc and fracture-reopening pressure Pr may each be considered to indicate the tangential (i.e., hoop) stress $\sigma_\theta$ (shown in FIG. 16) around borehole 18 and may be related to the principal stresses σ3 and σ1 in rock mass 12 according to equation 1 reproduced below:

$$Pr = Pc = 3\sigma 3 - \sigma 1, \tag{1}$$

where σ1 and σ3 are the maximum and minimum principal stresses in rock mass 12, Pr is the fracture-reopening pressure and Pc is the fracture-closure pressure.

As shown in FIG. 4, when borehole 18 is parallel to intermediate principal stress σ2, the angular position of fracture 48 about borehole 18 may substantially coincide (i.e., be aligned) with the direction of maximum principal stress σ1. The direction of the minimum principal stress σ3 may be substantially perpendicular to the direction of the induced fracture 48. In other words, when the direction of intermediate principal stress σ2 is already known to be parallel to the borehole 18, the directions of minimum principal stress σ3 and maximum principal stress σ1 may be determined based on the location of fracture 48 about borehole 18.

A plurality of tests (i.e., expansion and contraction cycles) with sleeve 16 or with one or more other sleeves 16 may be conducted in different orientations. For example, a plurality of (e.g., two, three or more) boreholes 18 drilled at different orientations from underground excavation 14 or from ground surface 19 may be used to conduct sleeve fracturing tests. In some situations, the sleeve fracturing tests may be conducted at different intervals 17 within the same borehole 18. In some situations, some or all of the sleeve fracturing tests may be conducted at different borehole orientations. From the plurality of sleeve fracturing tests and the plurality of pressure measurements acquired, a set of equations can be obtained based on equation 1 and used to calculate the magnitudes and optionally the directions of principal stresses σ1, σ2, σ3 in rock mass 12. In some situations, the use of sleeve fracturing tests as described herein may be used to recover a complete stress tensor for a segment of rock mass 12 as explained below.

Method 100 may include the use of expansion flow rate Qe and contraction flow rate Qc that have been selected to promote accuracy (e.g., detection sensitivity) in acquiring fracture-closure pressure Pc and/or fracture-reopening pressure Pr that are indicative of the state of stress in rock mass 12. In various situations, expansion flow rate Qe and contraction flow rate Qc may be selected to have the same value or different values (i.e., magnitudes). In any case, the values of expansion flow rate Qe and contraction flow rate Qc may be selected based on the size of test interval 17 occupied by sleeve 16, which may be defined by sleeve length L and borehole diameter D. For example, selecting expansion flow rate Qe and/or contraction flow rate Qc may include using diameter D of borehole 18 and axial length L of sleeve 16 along borehole 18 to determine the volume of test interval 17. Expansion flow rate Qe and/or contraction flow rate Qc may then be selected based on (i.e., as a function of) the volume of test interval 17. In some embodiments, a ratio of the volume of test interval 17 over expansion flow rate Qe or contraction flow rate Qc may be between 2 minutes and 60 minutes. In some embodiments, the ratio of the volume of test interval 17 over expansion flow rate Qe or contraction flow rate Qc may be between 5 minutes and 15 minutes. In some embodiments, the ratio of the volume of test interval 17 over expansion flow rate Qe or contraction flow rate Qc may be between 8 minutes and 12 minutes.

In various embodiments, method 100 may include maintaining expansion flow rate Qe and/or contraction flow rate Qc substantially constant for part (e.g., some, a majority, most) of the stroke length of piston 28 or for substantially the entirety of the stroke length of piston 28. Accordingly, method 100 may include acquiring fracture-closure pressure Pc, and while acquiring fracture-closure pressure Pc, removing liquid 22 from sleeve 16 at contraction flow rate Qc throughout a time period extending from before the closure of fracture 48 to after the closure of fracture 48. For example, the time period may extend from at least 10 seconds before the expected closure of fracture 48 to at least 10 seconds after the expected closure of fracture 48. Similarly, method 100 may include acquiring fracture-reopening pressure Pr, and while acquiring fracture-reopening pressure Pr, delivering liquid 22 to sleeve 16 at expansion flow rate Qe throughout a time period extending from before the opening of fracture 48 to after the opening of fracture 48. For example, the time period may extend from at least 10 seconds before the expected opening of fracture 48 to at least 10 seconds after the expected opening of fracture 48.

FIG. 6 is a table defining fluid flow rates Q1-Q4 and/or motor speeds S1-S4 for use with sleeve 16 and applicable to different volumes V1-V4 of test interval 17. The information in FIG. 6 may be provided to an operator of system 10 so that pump 20 may be set to provide a suitable expansion flow rate Qe and/or contraction flow rate Qc according to the specific testing parameters. For example, flow rates Qc, Qe and/or motor speeds S1-S4 may be provided as a function of diameter D (e.g., D1-D4) of borehole 18, as a function of axial length L (e.g., L1-L4) of sleeve 16 and/or as a function of the volume V (e.g., V1-V4) of test interval 17 defined by multiplying the cross-sectional area of borehole 18 with the effective axial length L of sleeve 16.

Figure 7A:
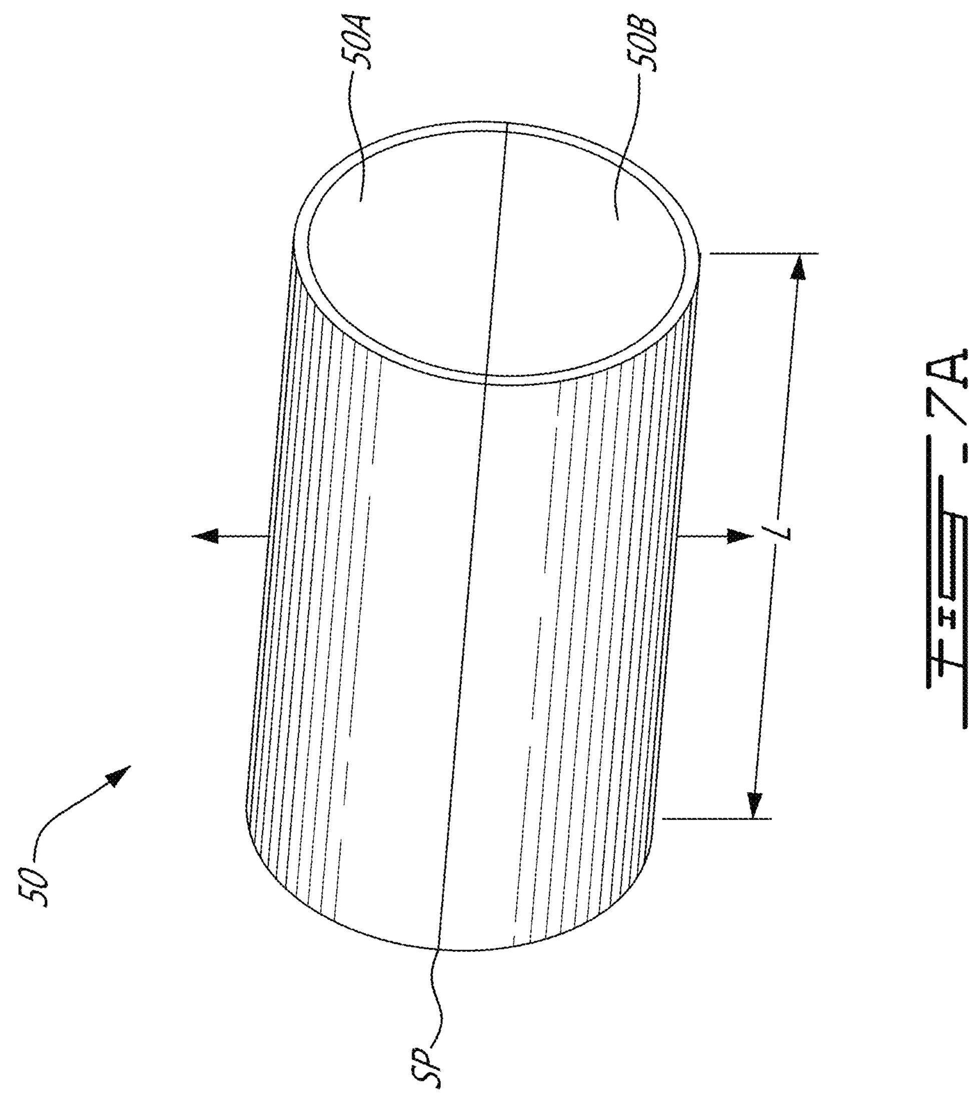
FIG. 7A is a perspective view of an exemplary split tubular casing for use with the expandable sleeve.

FIG. 7A is a perspective view of an exemplary optional split tubular casing 50, which may be part of system 10 and used with expandable sleeve 16. Split tubular casing 50 may be made from a relatively rigid material such as reinforced rubber or a metallic material such as steel for example. Split tubular casing 50 may at least partially enclose sleeve 16 during operation. Split tubular casing 50 may be split longitudinally (e.g., in half) in split plane SP to define first casing portion 50A and separate second casing portion 50B movable relative to each other. First casing portion 50A and second casing portion 50B may define two pipe halves facing each other. First casing portion 50A and the second casing portion 50B may each extend partially around sleeve 16. Split tubular casing 50 may be used to influence (e.g., dictate) the angular position of fracture 48 about borehole axis BA. In some embodiments, split tubular casing 50 may have no more than two casing portions 50A, 50B. In other words, split tubular casing 50 may be devoid of any other casing portions extending partially around sleeve 16.

During operation, split tubular casing 50 may be inserted between sleeve 16 and the wall of borehole 18 so that during the expansion of sleeve 16, the radial force exerted by sleeve 16 may be transferred onto the wall of borehole 18 via split tubular casing 50. This may be referred to as oriented sleeve fracturing. In some embodiments, split tubular casing 50 may have an axial length that covers the entire test interval 17 of sleeve 16. For example, the axial length of split tubular casing 50 may be substantially the same as axial length L of sleeve 16.

Figure 7B:
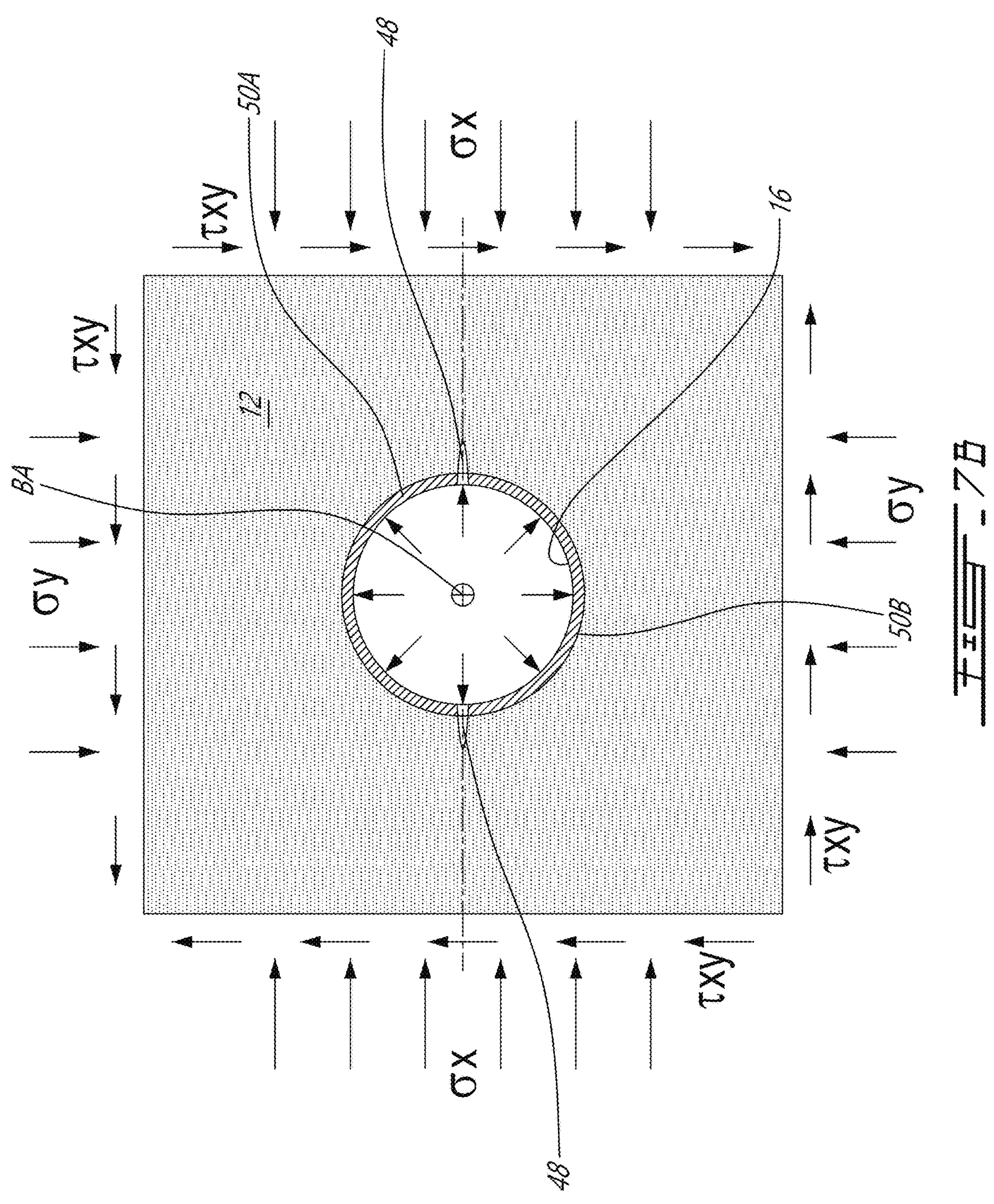
FIG. 7B is a transverse cross-sectional view of the expandable sleeve together with the split tubular casing of FIG. 7A inside the borehole.

FIG. 7B is a transverse cross-sectional view of sleeve 16 together with split tubular casing 50 in a plane that is normal to borehole axis BA. When using optional split tubular casing 50, first casing portion 50A and second casing portion 50B may be movable away from each other during the expansion of sleeve 16 and may influence the stress that is applied to the wall of borehole 18 so that a tensile stress is being applied at the location of the split between first casing portion 50A and second casing portion 50B. For example, a gap may form between first casing portion 50A and second casing portion 50B and the fracture 48 may be induced at the angular position(s) of the gap relative to borehole axis BA as shown in FIG. 7B. In other words, the position of fracture(s) 48 may substantially coincide with the position of split plane SP.

Sleeve 16, split tubular casing 50 and optionally other components of system 10 may be referred to as a sleeve fracturing tool. The use of split tubular casing 50 in method 100 may still include acquiring fracture-closure pressure Pc and/or fracture-reopening pressure Pr representative of local stresses $\sigma x$, $\sigma y$, $\tau xy$ acting in rock mass 12 around borehole 18. However, since the angular position of fracture 48 about borehole axis BA is influenced by split tubular casing 50, the angular position of fracture 48 may not necessarily be aligned with the orientation of maximum principal stress $\sigma$1 even if borehole 18 is parallel to the intermediate principal stress $\sigma$2. Accordingly, normal stresses $\sigma x$, $\sigma y$ may be oriented so that shear stress $\tau xy$ is also present. When using split tabular casing 50, the normal stress acting perpendicular to fracture 48 is being measured. This result can be used to form one instance of equation 1. Since there may be up to six unknowns in a condition where none of the magnitudes or directions of the three principal stresses $\sigma$1, $\sigma$2, $\sigma$3 are known, six tests may be needed to create six fractures 48 in six different directions to solve for the six unknowns using six instances of equation 1. The set of equations may form the general stress tensor in a Cartesian coordinate system. Then, the magnitudes and respective directions of the three principal stresses $\sigma$1, $\sigma$2, $\sigma$3 can be calculated using the set of equations. Split tubular casing 50 may be used in scenarios where the principal directions are known or in scenarios where the principal directions are unknown.

Figure 8A:
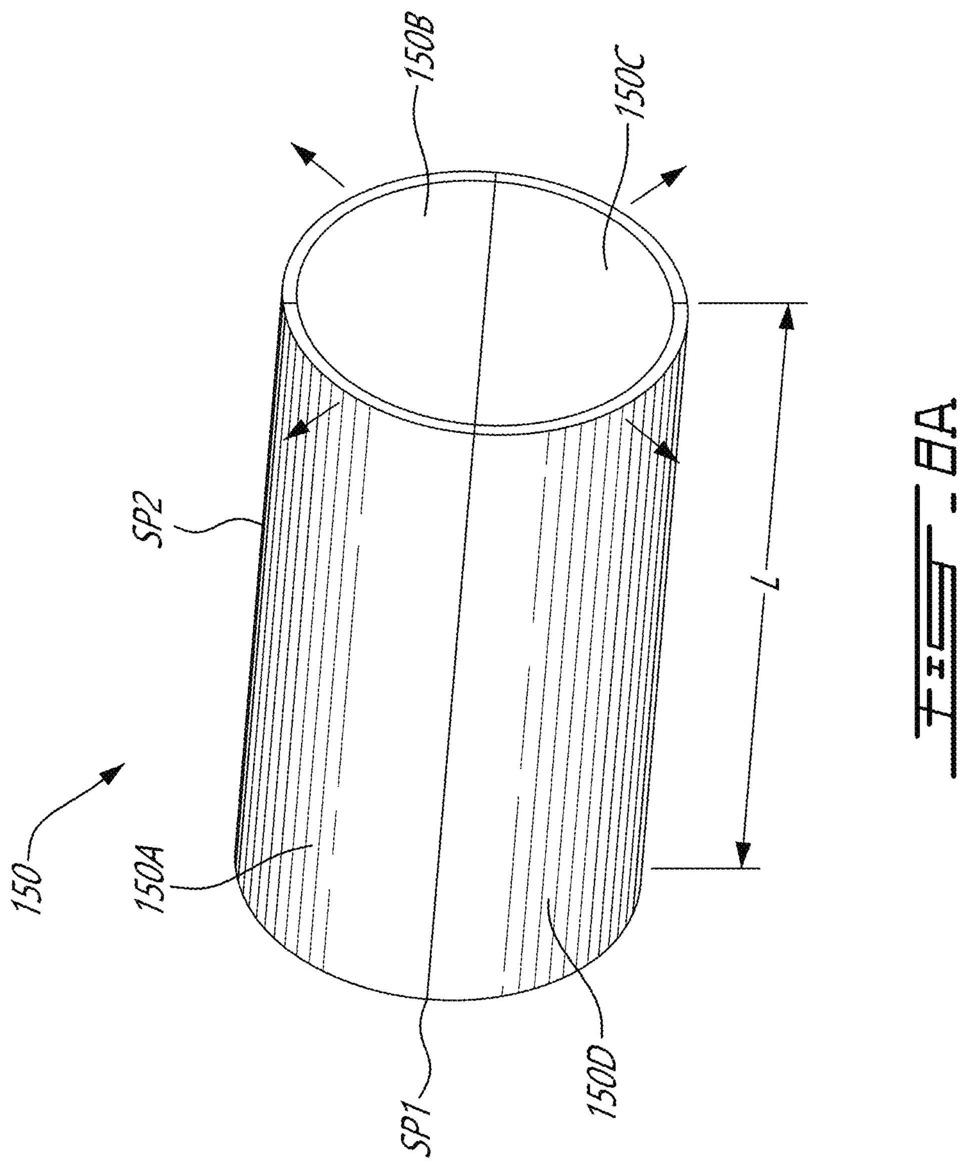
FIG. 8A is a perspective view of another exemplary split tubular casing for use with the expandable sleeve.

FIG. 8A is a perspective view of an exemplary optional double split tubular casing 150, which may be part of system 10 and used with expandable sleeve 16. Double split tubular casing 150 may be made from a relatively rigid material such as reinforced rubber or a metallic material such as steel for example. Double split tubular casing 150 may be used generally in the same manner as split tubular casing 50. However, in contrast with split tubular casing 50, double split tubular casing 150 may include two longitudinal split planes SP1 and SP2 to define separate casing portions 150A, 150B, 150C and 150D that are movable relative to each other. Casing portions 150A, 150B, 150C and 150D may define four pipe quarters each extending partially around sleeve 16.

During operation, double split tubular casing 150 may be inserted between sleeve 16 and the wall of borehole 18 so that during the expansion of sleeve 16, the radial force exerted by sleeve 16 may be transferred onto the wall of borehole 18 via double split tubular casing 150. Double split tubular casing 150 may have an axial length that covers the entire test interval 17 of sleeve 16.

FIG. 8B is a transverse cross-sectional view of sleeve 16 together with double split tubular casing 150 in a plane that is normal to borehole axis BA. When using optional double split tubular casing 150, casing portions 150A-150D may be movable away from each other during the expansion of sleeve 16. Double split tubular casing 150 may be used to influence (e.g., dictate) the angular positions of two sets of fractures 48A, 48B about borehole axis BA. The positions of fractures 48A, 48B may substantially coincide with the positions of split planes SP1, SP2 respectively. Since the magnitudes of $\sigma x$ and $\sigma y$ may differ, the two sets of fractures 48A, 48B may be created at different times during the expansion of sleeve 16. Accordingly, double split tubular casing 150 may be installed and used when preconceived (i.e., a priori) knowledge of the state of stress in rock mass 12 exists so that the order of creation of fractures 48A, 48B may also be preconceived. The known order of creation of fractures 48A, 48B may then be used to associate the correct pressure measurements with the respective set of fractures 48A, 48B during the expansion and/or contraction of sleeve 16. In contrast with split tubular casing 50, the use of double split tubular casing 150 may permit two sleeve fracturing tests to be conducted at once with a single installation and utilization of double split tubular casing 150.

Figure 9:
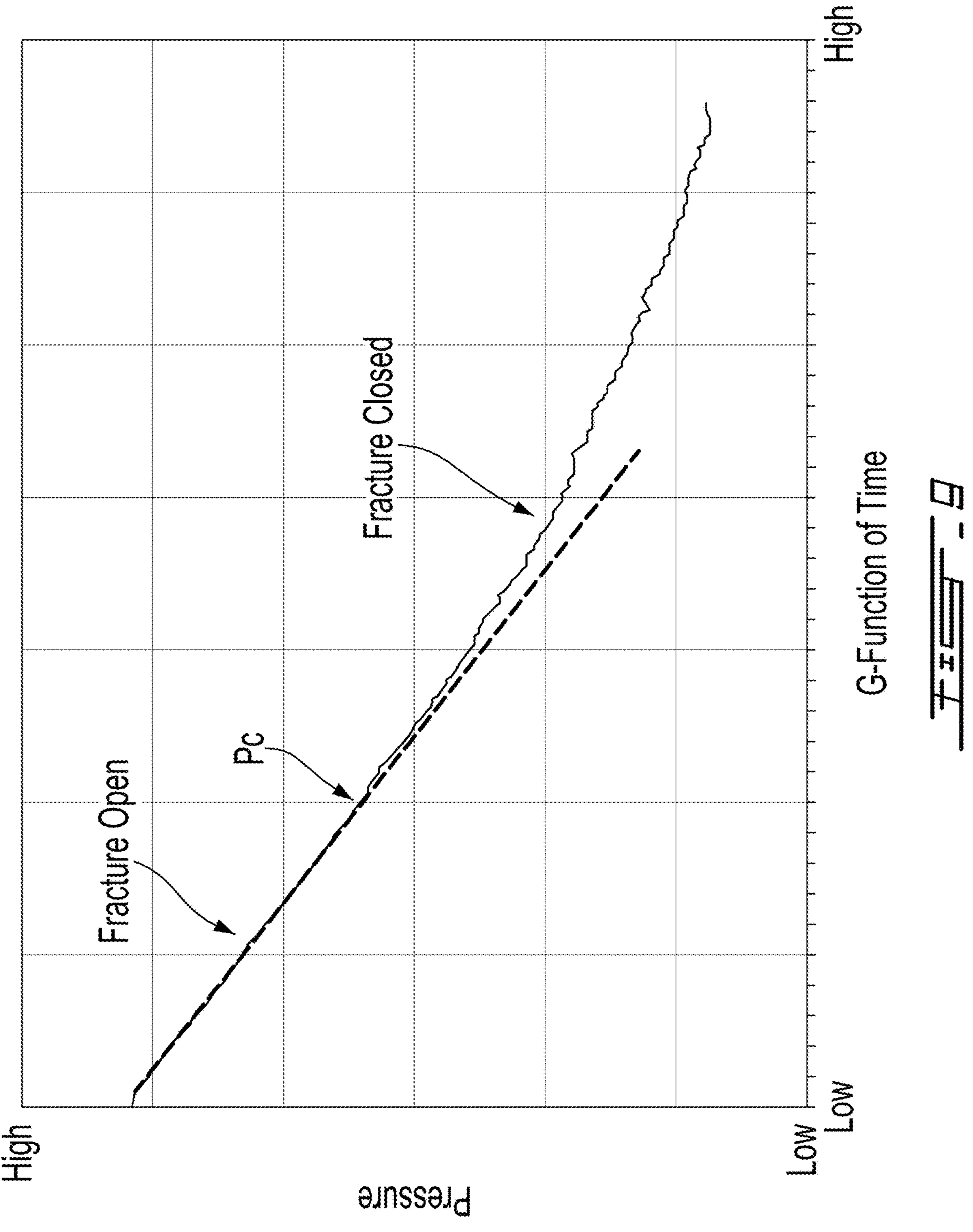
FIG. 9 is a plot showing an exemplary relationship between a pressure of the fluid and a G-function of time acquired during contraction of the expandable sleeve.

FIG. 9 is a plot showing an exemplary relationship between a pressure of liquid 22 acquired during the use of sleeve 16 and a G-function of time. The G-function of time is a dimensionless function of time that linearizes a pressure response during a fracture flow regime. The G-function of time may magnify the time axis. In some embodiments, a G-function of time as described in the following non-patent document may be used: Nolte, K. G. "Principles for Fracture Design Based on Pressure Analysis." SPE Prod Eng 3 (1988): pages 22-30. Other function(s) that magnifies the time axis may be suitable. In some embodiments, a derivative of the G-function may be used.

FIG. 9 illustrates a situation where sleeve 16 is contracting and a closure of fracture 48 occurs at fracture-closure pressure Pc. To identify fracture-closure pressure Pc, which is indicative of a stress concentration at the wall of borehole 18, the relationship between the pressure of liquid 22 during the contraction of sleeve 16 and the G-function of time is determined. Fracture-closure pressure Pc corresponds to a transition between a linear portion of the relationship and a non-linear portion of the relationship. Specifically, the relationship shows a linear trend as long as fracture 48 is open and deviates from a straight line when fracture 48 closes.

Fracture-reopening pressure Pr may similarly be determined using a relationship between the pressure of liquid 22 during the expansion of sleeve 16 and the G-function of time. When the G-function of time is used, fracture-reopening pressure Pr would also correspond to a transition between a non-linear portion of the relationship and a linear portion of the relationship. The relationship would show a non-linear trend as long as fracture 48 is closed and would become substantially linear when fracture 48 opens.

Other relationships including the pressure of liquid 22 acquired during the use of sleeve 16 may be used to identify fracture-closure pressure Pc and/or fracture-reopening pressure Pr. Such relationships may include functions of time and/or functions of pressure. In some embodiments, fracture-closure pressure Pc and/or fracture-reopening pressure Pr may be identified using, for example, an inflection point and/or a change in slope in such relationship.

Figure 10:
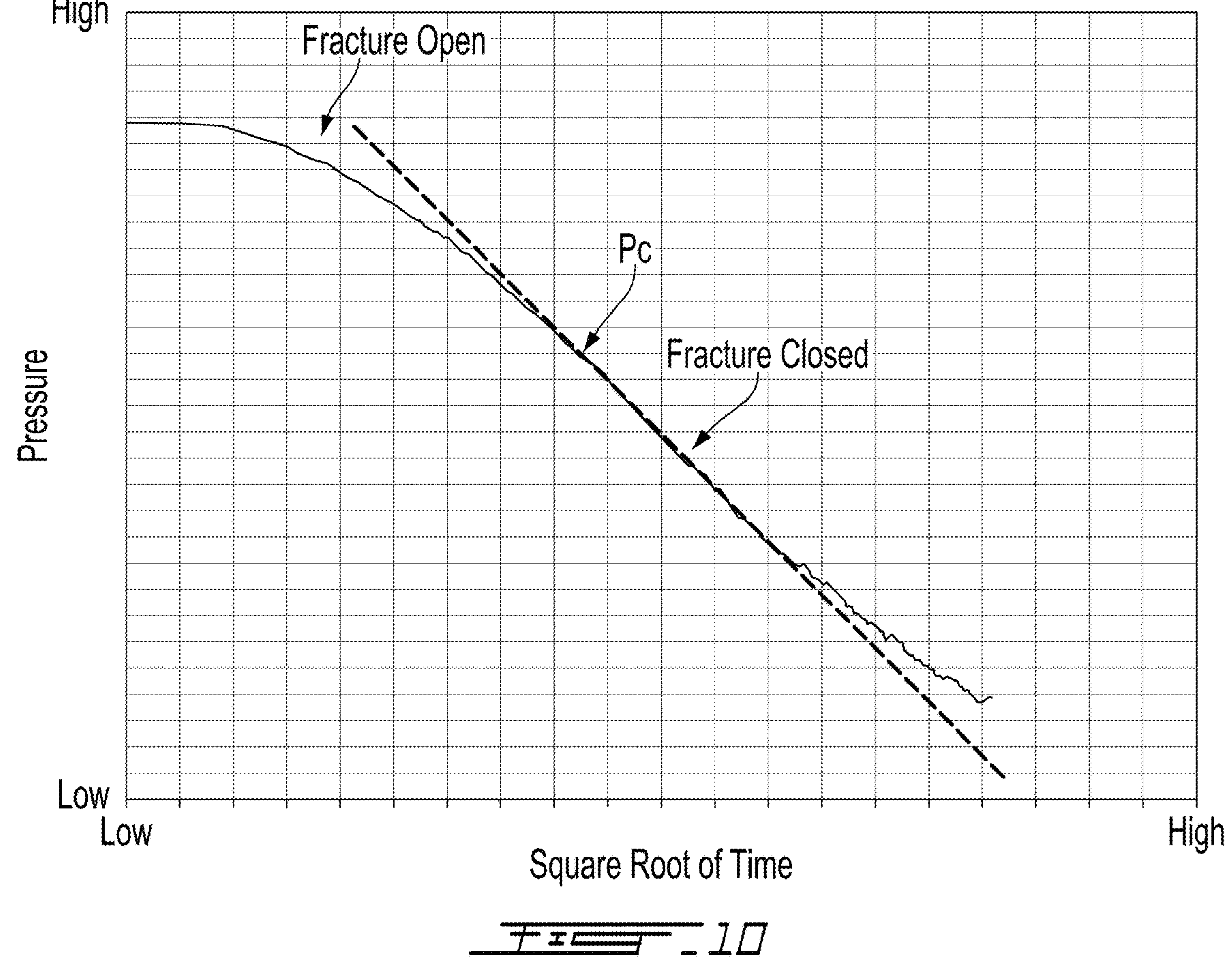
FIG. 10 is a plot showing an exemplary relationship between the pressure of the fluid and a square root of time acquired during contraction of the expandable sleeve.

FIG. 10 is a plot showing an exemplary relationship between a pressure of liquid 22 acquired during use of sleeve 16 and a square root of time. The square root function of time may magnify the time axis. FIG. 10 illustrates a situation where sleeve 16 is contracting and a closure of fracture 48 occurs at fracture-closure pressure Pc. To identify fracture-closure pressure Pc, the relationship between the pressure of liquid 22 during the contraction of sleeve 16 and the square root of time is determined. Fracture-closure pressure Pc corresponds to a transition between a linear portion of the relationship and a non-linear portion of the relationship. Specifically, the relationship shows a non-linear trend as long as fracture 48 is open and becomes substantially linear when fracture 48 closes.

Fracture-reopening pressure Pr may similarly be determined using a relationship between the pressure of liquid 22 during the expansion of sleeve 16 and the square root of time. Fracture-reopening pressure Pr would also correspond to a transition between a non-linear portion of the relationship and a linear portion of the relationship. The relationship would show a linear trend when fracture 48 is closed and would deviate from a straight line when fracture 48 opens. In some embodiments, a derivative of the square root function may be used.

FIG. 11 is a flow diagram of an exemplary method 200 of determining one or more (e.g., principal, normal, shear) stresses in rock mass 12 from underground excavation 14 or from ground surface 19 shown in FIG. 17. Method 200 may be performed using system 10 described herein or using another system. Aspects of method 200 may be combined with aspects of other methods described herein. For example, method 200 may incorporate method 100. Method 200 may include aspects of system 10. In various embodiments, method 200 may include:

from underground excavation 14 or from ground surface 19, optionally drilling two or more boreholes 18 extending into rock mass 12, the two or more boreholes 18 having different orientations (block 202);

for each of the two or more boreholes 18:

inserting expandable sleeve 16 into borehole 18;

delivering liquid 22 to sleeve 16 to expand sleeve 16 while sleeve 16 is inside borehole 18 to induce fracture 48 in rock mass 12 using sleeve 16;

after inducing fracture 48 in rock mass 12, contracting sleeve 16 by removing liquid 22 from sleeve 16 to cause closing of fracture 48, and performing at least one of the following:

acquiring fracture-closure pressure Pc of liquid 22 that is indicative of the stress in rock mass 12 by, while contracting sleeve 16, recording fracture-closure pressure Pc indicative of a pressure of liquid 22 inside sleeve 16 at a time coinciding with a closure of fracture 48 in rock mass 12; and/or acquiring fracture-reopening pressure Pr of liquid 22 that is indicative of the stress in rock mass 12 by: expanding sleeve 16 by delivering liquid 22 to sleeve 16 to cause reopening of fracture 48; and recording fracture-reopening pressure Pr indicative of the pressure of liquid 22 inside sleeve 16 at a time coinciding with the reopening of fracture 48 in rock mass 12 (block 204); and using fracture-closure pressures Pc and/or fracture-reopening pressures Pr, determining one or more (e.g., principal, normal, shear) stresses in rock mass 12 (block 206).

In some embodiments of method 200, the two or more boreholes 18 may have been previously drilled so that drilling of boreholes 18 may not necessarily be part of method 200. In some embodiments, the two or more boreholes may include three boreholes 18 having different orientations and extending into rock mass 12 from underground excavation 14 or from ground surface 19. Aspects of method 200 are described below in relation to the subsequent figures.

In various embodiments of methods 100 and 200, once the state of stress in rock mass 12 has been determined, one or more operations may be conducted on rock mass 12. For example, methods 100 may 200 may be incorporated into methods that include processing (e.g., manipulation) of rock mass 12. Examples of processes performed on rock mass 12 based on the stress state may include (e.g., de-stress) blasting, excavating, drilling, mining and/or well stimulation such as hydraulic fracturing (i.e., fracking).

Method 200 may include performing both the acquiring of the fracture-closure pressure Pc and the acquiring of the fracture-reopening pressure Pr.

Method 200 may include selecting a flow rate as a function of a size of test interval 17 occupied by sleeve 16 inside borehole 18. Removing the liquid from sleeve 16 to cause closing of the fracture may include removing the liquid at the flow rate. Delivering the liquid to sleeve 16 to cause opening of the fracture may include delivering the liquid at the flow rate. Selecting the flow rate may include: using a cross-sectional area of borehole 18 and an axial length of sleeve 16 along borehole 18 to determine a volume of test interval 17; and selecting the flow rate based on the volume of test interval 17.

In some embodiments, a ratio of the volume of test interval 17 over the flow rate may be between 2 minutes and 60 minutes. A ratio of the volume of test interval 17 over the flow rate may be between 2 minutes and 30 minutes. A ratio of the volume of test interval 17 over the flow rate may be between 5 minutes and 15 minutes.

Method 200 may include inserting split tubular casing 50 between sleeve 16 and a wall of borehole 18 to influence a position of the fracture in the rock mass 12. Split tubular casing 50 may be split longitudinally into a first casing portion and a second casing portion movable relative to each other. Method 200 may include acquiring fracture-closure pressure Pc and/or acquiring fracture-reopening pressure Pr for six fractures having six different positions in the rock mass. Method 200 may include using fracture-closure pressure Pc and/or fracture-reopening pressure Pr for the six fractures, determining a stress tensor for rock mass 12. In some embodiments, split tubular casing 50 may be split longitudinally into the first casing portion, the second casing portion, a third casing portion and a fourth casing portion movable relative to each other.

Sleeve 16 may include a packer operable to record an angular position of the fracture about borehole 18.

Boreholes 18 may extend into rock mass 12 from underground excavation 14. Sleeve 16 may be inserted into boreholes 18 from underground excavation 14.

Boreholes 18 may extend into rock mass 12 from ground surface 19 above rock mass 12. Sleeve 16 may be inserted into boreholes 18 from ground surface 19.

Figure 12B:
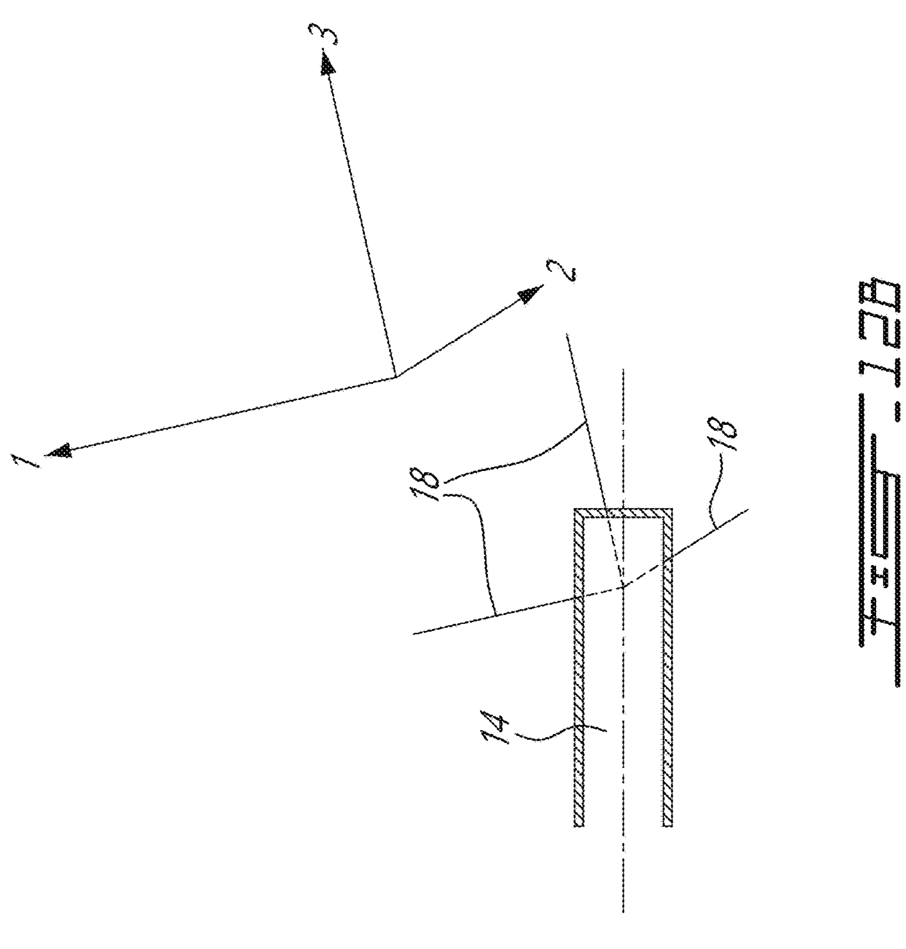
FIGS. 12A-12C are schematic illustrations of exemplary boreholes drilled from an underground excavation for determining the magnitudes of the principal stresses in the rock mass when the directions of the principal stresses are already known.
Figure 12A:
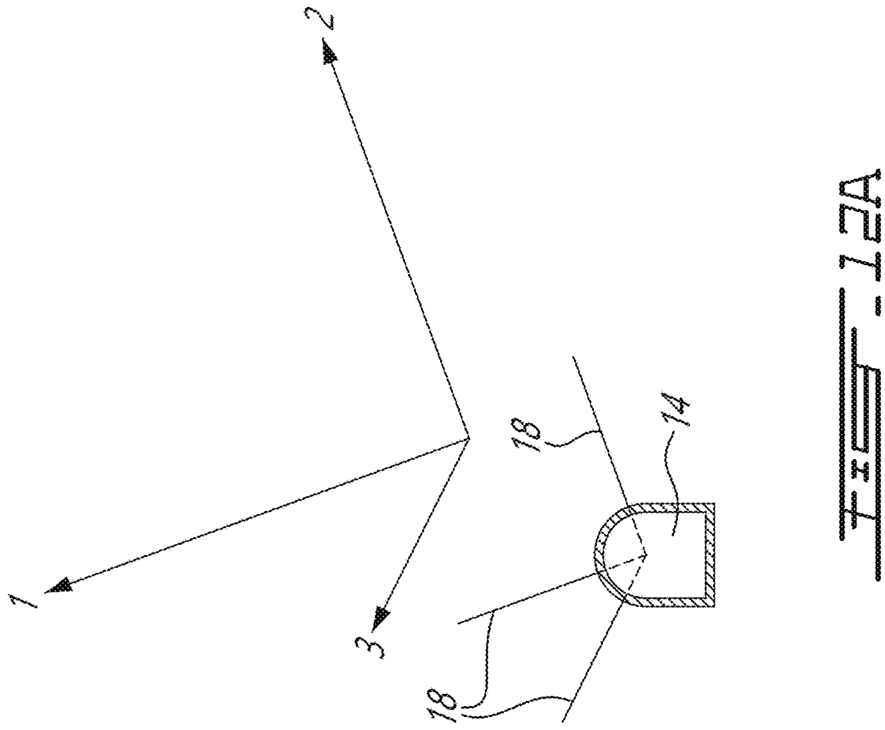
Figure 12:
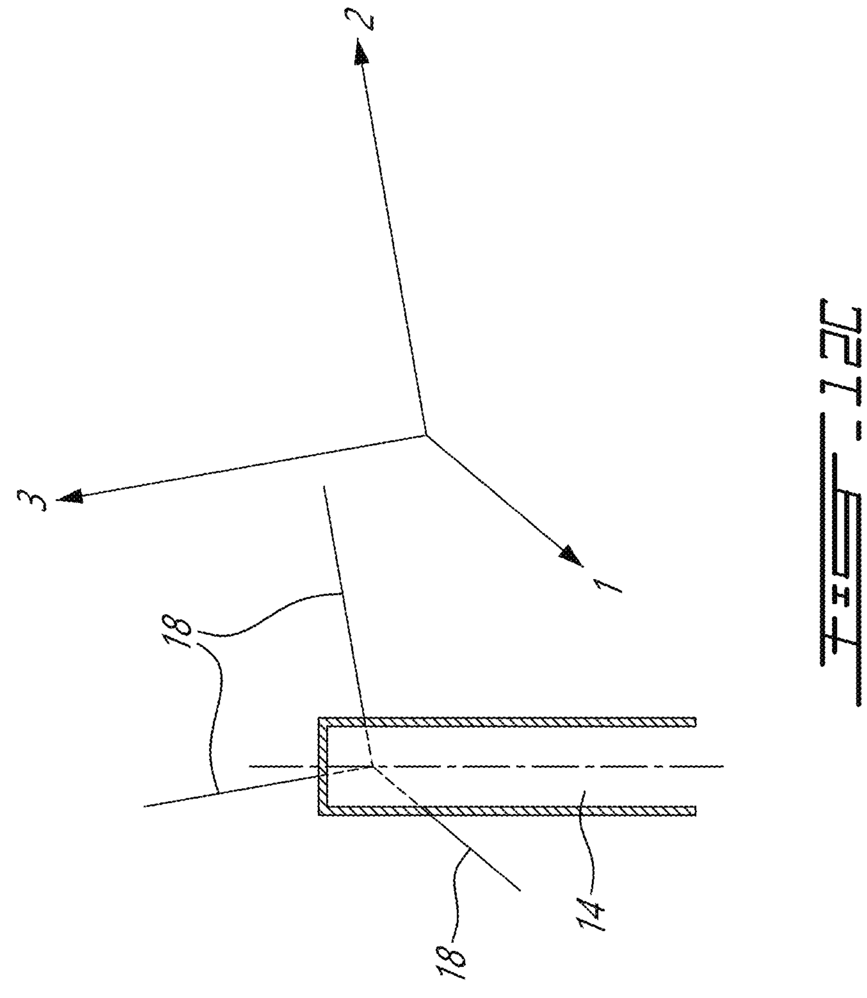

FIGS. 12A-12C are schematic illustrations of exemplary boreholes 18 drilled from underground excavation 14 (e.g., tunnel) for determining one or more magnitudes of one or more principal stresses σ1, σ2 and σ3 in rock mass 12 when the respective directions 1, 2, 3 of principal stresses σ1, σ2 and σ3 are already known. FIGS. 12A-12C respectively show a north (end-on) view of underground excavation 14 (e.g., tunnel), a side elevation view of underground excavation 14 and a top plan view of underground excavation 14. In some situations, the principal directions may already be known via prior testing, simulation and/or modeling, and may not need to be determined using method 200. Accordingly, in various embodiments of method 200, determining principal stresses σ1, σ2 and σ3 in rock mass 12 may include determining only one or more magnitudes of principal stresses σ1, σ2 and σ3, or determining both the magnitudes and directions of principal stresses σ1, σ2, σ3.

When the three respective directions of principal stresses σ1, σ2, σ3 are known prior to conducting the sleeve fracture testing (e.g., prior to acquiring fracture-closure pressure Pc and/or fracture-reopening pressure Pr) but the three respective magnitudes of principal stresses σ1, σ2, σ3 are unknown, method 200 may include optionally drilling and using a borehole 18 extending along (parallel to) each of the three respective known principal directions. In other words, three orthogonal boreholes 18 (and optionally one or more additional boreholes 18) may be used for sleeve fracture testing in this situation. Fracture-closure pressure Pc and/or fracture-reopening pressure Pr may be acquired for each borehole 18 and the magnitudes of maximum principal stress σ1 and minimum principal stress σ3 may be determined as explained above. Based on equation 1 above, a set of equations may be used to relate the measured pressure values to principal stresses σ1, σ2 and/or σ3. For each direction of the sleeve fracturing test, equation (1) may be used to create a set of three equations 2-4 shown below which may be used for solving for the unknown magnitudes of principal stresses σ1, σ2, σ3.

$$P_{r1} = 3\sigma_3 - \sigma_1, \quad (2)$$

$$P_{r2} = 3\sigma_2 - \sigma_1, \quad (3)$$

$$P_{r3} = 3\sigma_3 - \sigma_2 \quad (4)$$

When the three respective directions and only one of the three respective magnitudes of principal stresses σ1, σ2, σ3 are known prior to conducting the sleeve fracture testing, method 200 may include optionally drilling and using a borehole 18 extending along (parallel to) two of the three respective known principal directions having unknown principal stress magnitudes. Fracture-closure pressure Pc and/or fracture-reopening pressure Pr may then be acquired from the two boreholes 18 and the magnitudes of principal stresses σ1 and σ3 may be determined as explained above for the two boreholes 18 using two equations for solving two unknowns.

When the three respective principal directions and two of the three respective magnitudes of principal stresses $\sigma 1$, $\sigma 2$ and $\sigma 3$ are known prior to conducting the sleeve fracture testing, method 200 may include optionally drilling and using a borehole 18 extending perpendicular to the direction of the unknown principal stress magnitude but parallel to the direction of one of the known principal stresses. Fracture-closure pressure Pc and/or fracture-reopening pressure Pr may then be acquired from the one borehole 18 and the magnitude of the principal stress that is missing may be determined using one instance of equation 1.

The number of boreholes 18 and the configuration of the array of boreholes 18 selected may depend on how many, if any, of principal directions are already known.

Figure 13A:
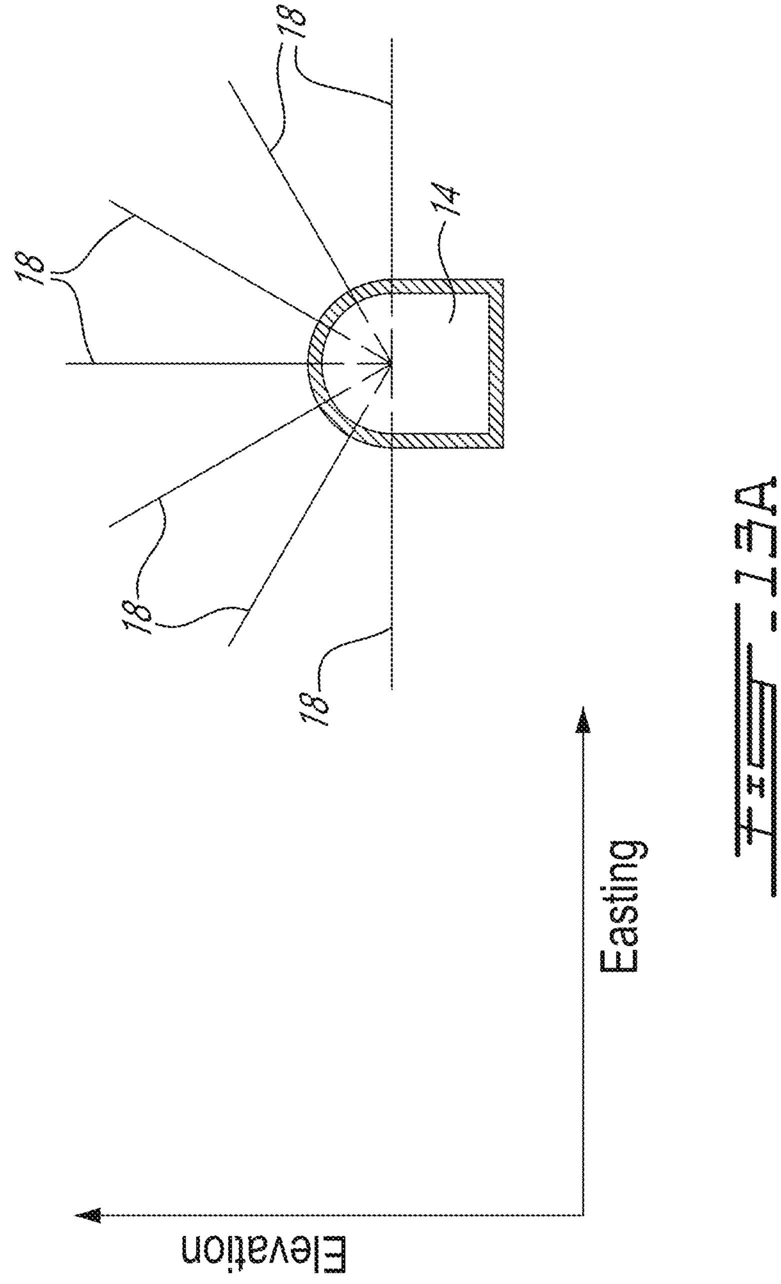
FIGS. 13A-13C are schematic illustrations of exemplary boreholes drilled from an underground excavation for determining the magnitudes and directions of the principal stresses in the rock mass.
Figure 13B:
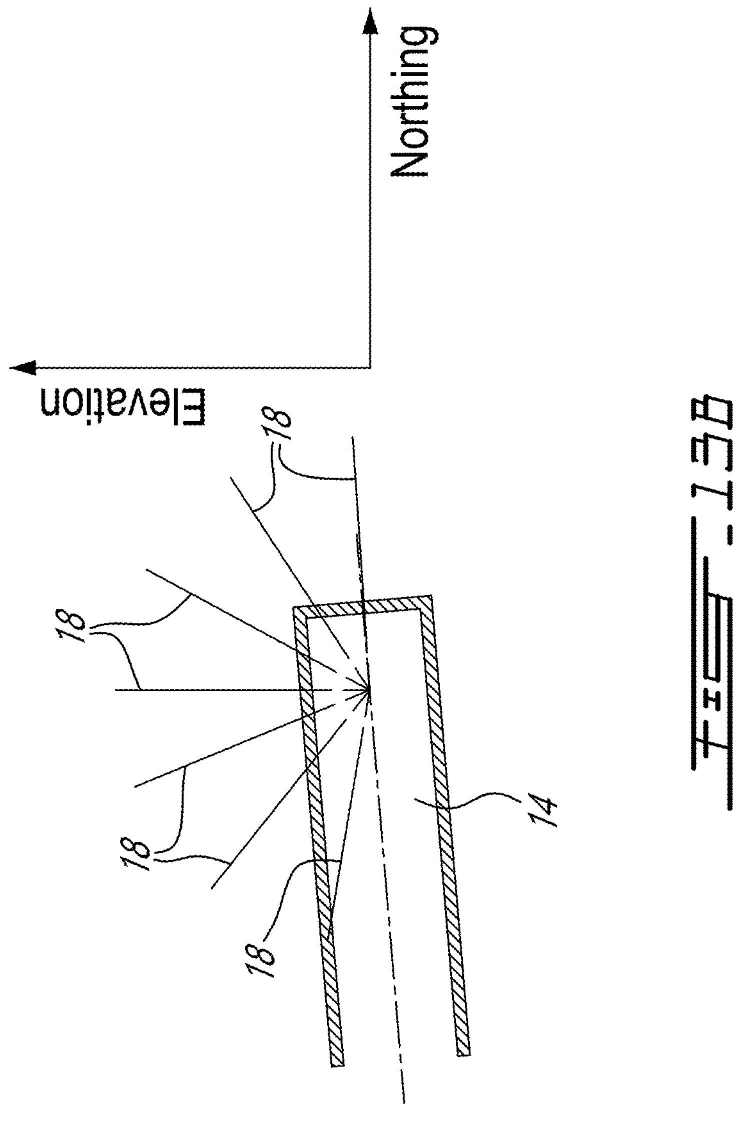
Figure 13C:
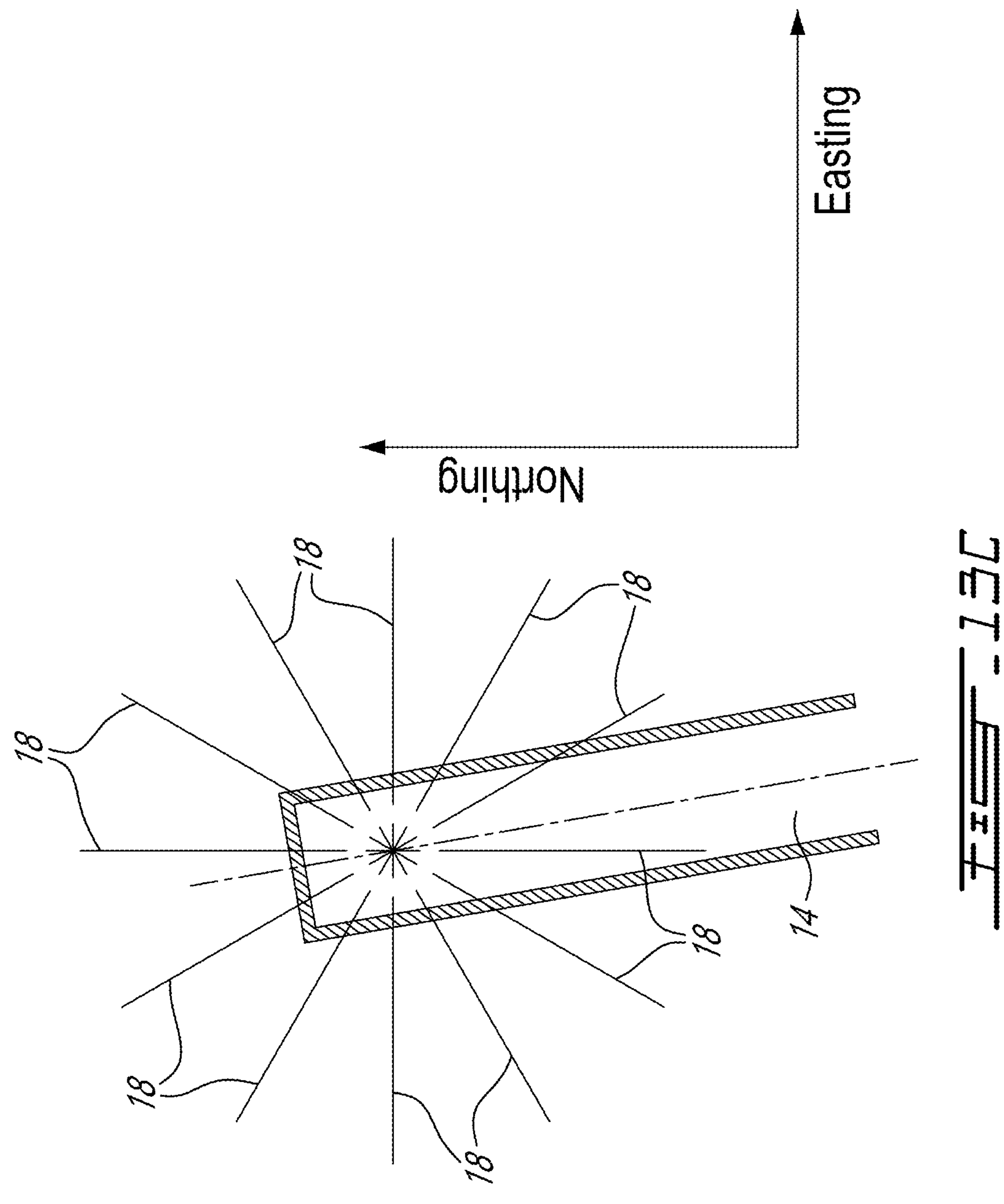

FIGS. 13A-13C is a schematic illustration of exemplary boreholes 18 drilled from underground excavation 14 (e.g., tunnel) for determining both the magnitudes and directions of principal stresses $\sigma 1$, $\sigma 2$, $\sigma 3$ in rock mass 12. In other words, some of the magnitudes and directions of principal stresses $\sigma 1$, $\sigma 2$, $\sigma 3$ are unknown prior to conducting the sleeve fracture testing. FIGS. 13A-13C respectively show a cross section (end-on) view of underground excavation 14 (e.g., tunnel), a side elevation view of underground excavation 14 and a top plan view of underground excavation 14. Method 200 may include optionally drilling and using an array of (two or more) boreholes 18 extending from underground excavation 14 at different orientations to perform sleeve fracture testing. Based on equation 1 above, a set of equations may then be created and used to relate fracture-closure pressure Pc and/or fracture-reopening pressure Pr and positions of fractures 48 to directions and magnitudes of principal stresses $\sigma 1$, $\sigma 2$, $\sigma 3$.

When two of the three respective directions of principal stresses $\sigma 1$, $\sigma 2$ and $\sigma 3$ are unknown prior to conducting the sleeve fracture testing, and respective magnitudes of principal stresses $\sigma 1$, $\sigma 2$, $\sigma 3$ are also unknown, method 200 may include optionally drilling and using two or more boreholes 18 extending in different directions through a plane that is perpendicular to the principal direction that is known to perform sleeve fracture testing. Based on equation 1 above, a set of equations may then be created and used to relate fracture-closure pressure Pc and/or fracture-reopening pressure Pr and positions of fractures 48 to directions and magnitudes of principal stresses $\sigma 1$, $\sigma 2$, $\sigma 3$.

When three directions and three magnitudes of principal stresses $\sigma 1$, $\sigma 2$, $\sigma 3$ are unknown prior to conducting the sleeve fracture testing, method 200 may include optionally drilling an array of boreholes 18 and conducting sleeve fracturing tests in each borehole 18 of the array. The array of boreholes 18 may be configured to pierce and be distributed across half of a cartesian coordinate system (i.e., be distributed across and pierce half of an imaginary sphere) in rock mass 12 as shown in FIGS. 13A-13C. The magnitudes and directions of principal stresses $\sigma 1$, $\sigma 2$, $\sigma 3$ may be determined from the results of the sleeve fracturing tests conducted in the array of boreholes 18.

For example, the orientations of boreholes 18 exhibiting the minimum and maximum fracture-closure pressure Pc and/or fracture-reopening pressure Pr may indicate the orientations of principal stresses $\sigma 1$, $\sigma 2$, $\sigma 3$. The borehole 18 exhibiting the minimum fracture-closure pressure Pc and/or fracture-reopening pressure Pr may be considered to be parallel to the direction of intermediate principal stress $\sigma 2$. The borehole 18 exhibiting the maximum fracture-closure pressure Pc and/or fracture-reopening pressure Pr may be considered to be parallel to the direction of minimum principal stress $\sigma 3$. The direction of maximum principal stress $\sigma 1$ may be considered to be perpendicular to the other two principal directions. Based on equation 1 above, a set of equations may then be created from the plurality of sleeve fracturing tests and used to relate fracture-closure pressures Pc and/or fracture-reopening pressures Pr to magnitudes of principal stresses $\sigma 1$, $\sigma 2$, $\sigma 3$.

In some embodiments, the array of boreholes 18 may be configured as a plurality of rows of boreholes 18 extending partially around underground excavation 14. The rows may be oriented transversely across underground excavation 14. As shown in FIG. 12A, boreholes 18 spaced along a row may be angularly distributed evenly (e.g., 30-degree intervals) or unevenly between orientations of 0 degree and 180 degrees in the easting-elevation plane shown in FIG. 13A. As shown in FIG. 13B, a number of rows of boreholes 18 may be selected and may be angularly distributed evenly or unevenly between orientations of 0 degree and 90 degrees in the northing-elevation plane. In some embodiments boreholes 18 in the array may optionally but not necessarily share the same intersection point inside of underground excavation 14. In some embodiments, boreholes 18 may be distributed across and drilled substantially perpendicular to the imaginary half sphere. In other words, boreholes 18 may be arranged in a partial spherical array.

The level of precision in assessing principal stresses $\sigma 1$, $\sigma 2$, $\sigma 3$ may depend on the number of boreholes 18 and the range of orientations covered by the array of boreholes 18. Other configurations or arrays of boreholes 18 may also be suitable. Boreholes 18 may be distributed according to regular or irregular patterns. In some situations, redundant sleeve fracturing tests may be conducted in different boreholes 18 and/or at different test intervals 17 within the same boreholes 18 to refine the results obtained. In some situations, a segment of underground excavation 14 may be re-drilled with new boreholes 18 to do additional sleeve fracture testing. The drilling of borehole(s) 18 may performed before or after any sleeve fracture testing has been performed in the same segment of underground excavation 14.

Figure 14:
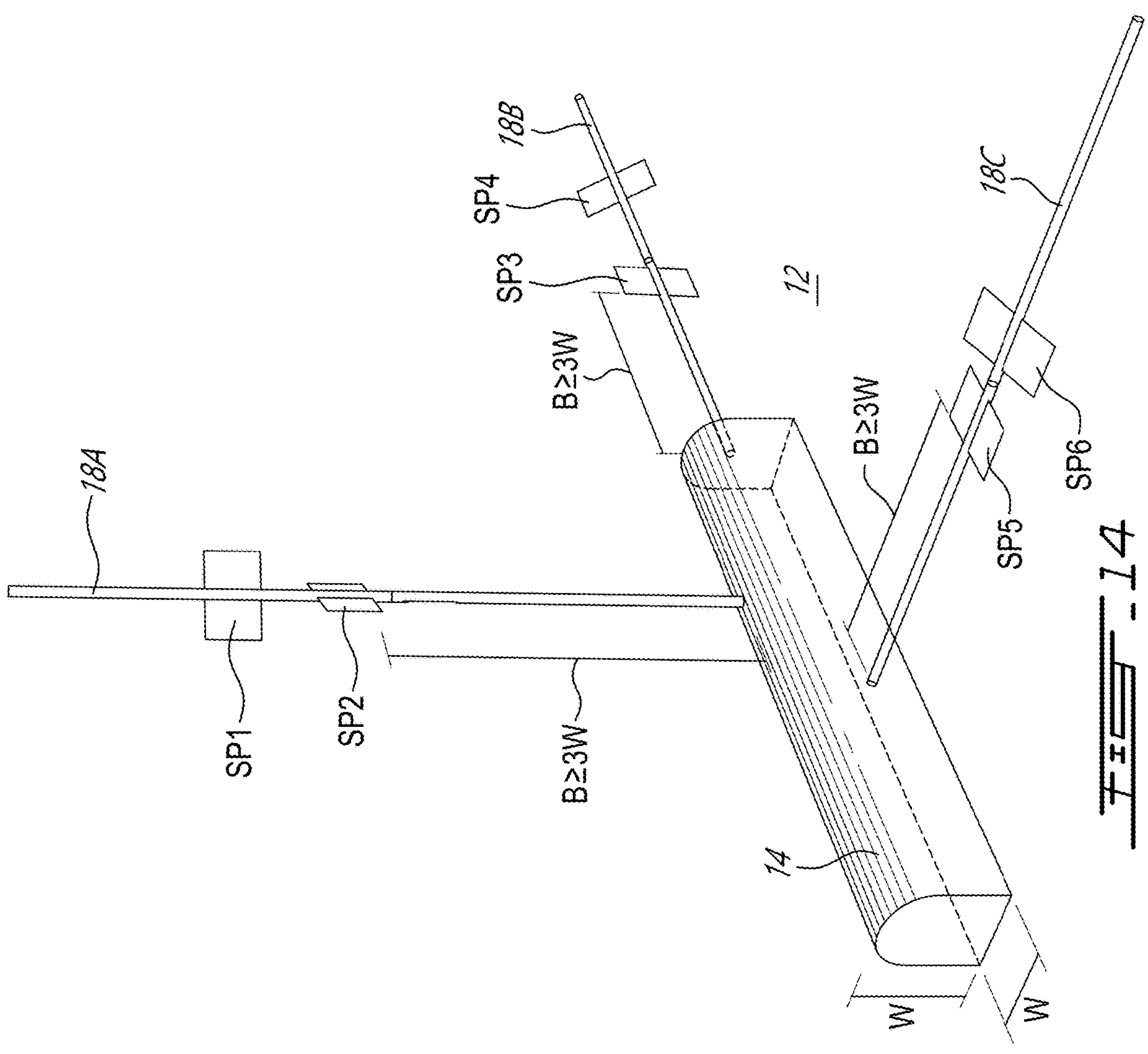
FIG. 14 is a perspective view of other exemplary boreholes drilled from an underground excavation for determining a stress tensor for a segment of the rock mass.

FIG. 14 is a schematic illustration of an exemplary arrangement of three boreholes 18A-18C drilled from underground excavation 14 and which may be used to determine a complete stress tensor for rock mass 12 using results from sleeve fracture testing as described herein when the directions and magnitudes of principal stresses $\sigma 1$, $\sigma 2$, $\sigma 3$ are unknown prior to conducting the sleeve fracture testing. Method 200 may include inserting split tubular casing 50 (or double split tubular casing 150 in some situations) between sleeve 16 and the wall of the borehole 18A-18C to influence the position of fracture(s) 48 in rock mass 12. Method 200 may include acquiring fracture-closure pressure Pc and/or acquiring fracture-reopening pressure Pr for at least six fractures 48 having six different orientations in rock mass 12. The six sleeve fracturing tests may be conducted in two or more (e.g., three) boreholes 18A-18C as long as at least two of the boreholes 18 are non-parallel and two or more of the six fracture orientations are non-parallel. The six sleeve fracturing tests may be conducted so that three or more different borehole orientations are covered. For example two sleeve fracturing tests with different fracture orientations may be conducted in each of the three boreholes 18A-18C. The three boreholes 18A-18C may be non-parallel to each other. In some embodiments, the three boreholes 18A-18C may be substantially orthogonal to each other. In some embodiments, first split plane SP1 and second split plane SP2 may be non-parallel (e.g., between 2-90 degrees apart), third split plane SP3 and fourth split plane SP4 may be non-parallel (e.g., between 2-90 degrees apart), and fifth split plane SP5 and sixth split plane SP6 may be non-parallel (e.g., between 2-90 degrees apart). Other angular spacings between the split planes may be suitable. In some embodiments, all six split planes SP1, SP2, SP3, SP4, SP5 and SP6 may be non-parallel to each other.

FIG. 14 illustrates an example of the different orientations of split planes SP1-SP6 of split tubular casing 50 used for influencing (e.g., dictating) the orientation of the six fractures 48. Method 200 may include determining six local (e.g., tangential) stresses respectively associated with the six fracture 48 using fracture-closure pressure Pc and/or the fracture-reopening pressure Pr for the six fractures 48. Method 200 may include using the six sets of fracture-closure pressure Pc and/or the fracture-reopening pressure Pr measurements to determine a complete stress tensor and/or the three directions and magnitudes of principal stresses σ1, σ2, σ3 in rock mass 12.

FIGS. 15A-15C illustrate reference geometry and nomenclature that may be used to compute a complete stress tensor [σ] (shown in equation 5 below) for a segment of rock mass 12. Stress tensor [σ] may completely define the state of stress at the applicable location within rock mass 12. FIG. 15A shows a right-handed global x', y', z' Cartesian coordinate system and a left-handed N (northing), E (easting), Z (vertical/elevation) coordinate system that may or may not share the same reference point. The N, E, and Z axes coincide with the y', x', and z' axes, respectively. An exemplary borehole 18 is drilled in rock mass 12 from underground excavation 14 or from ground surface 19. When drilled from underground excavation 14, borehole 18 may have a length greater than 3 times the average span W (shown in FIG. 14) of underground excavation 14 along the direction of borehole 18 so that test interval(s) 17 reside outside the excavation's stress disturbance zone. In other words, test interval(s) 17 may be within a target zone within rock mass 12 that is undisturbed by the presence of underground excavation 14. FIG. 15B is a top plan view of the left-handed N, E, Z coordinate system.

The orientation of borehole axis BA may be defined in terms of trend T (shown in FIG. 15B) and plunge P (shown in FIG. 15A) in the N, E, Z coordinate system. The trend T is an angle measured from N axis in the NE plane. The plunge P is an angle measured from the horizontal NE plane.

In reference to FIG. 15C, a right-handed x, y, z coordinate system is defined where the x-axis is horizontal and in the radial direction r of the borehole cross-section perpendicular borehole axis BA. The y-axis is perpendicular to both borehole axis BA and the x-axis. The z-axis is perpendicular to both the x-axis and the y-axis in the opposite direction of the trend T of borehole axis BA, as shown in FIG. 15C. Stress transformation rules may be used to transform stress tensor [σ'] that relates to coordinate system x', y', z', one or more times to achieve a stress tensor [σ] that relates to coordinate system x, y, z in accordance with equation (5) below:

$$[\sigma] = [Q^T][\sigma'][Q], \tag{5}$$

where Q is a geometric transformation matrix and QT is a transpose of Q.

In some embodiments, two transformations Q may be applied. The first transformation may be a rotation of −T degrees around the z'-axis, where T is the trend of borehole axis BA measured counterclockwise from the N axis. The transformation matrix Q for this rotation may be represented by equation (6) below:

$$[Q] = \begin{bmatrix} \cos T & \sin T & 0 \\ -\sin T & \cos T & 0 \\ 0 & 0 & 1 \end{bmatrix} \tag{6}$$

The second transformation may be a rotation of 90-P degrees around the x-axis where P is the plunge of borehole axis BA measured downward from a horizontal plane as shown in FIG. 15A. The transformation matrix Q for this rotation may be represented by equation (7) below:

$$[Q] = \begin{bmatrix} 1 & 0 & 0 \\ 0 & \sin P & -\cos P \\ 0 & \cos P & \sin P \end{bmatrix} \tag{7}$$

Applying the two transformations Q to stress tensor [σ'] will result in the transformed stress tensor [σ] in the x, y, z coordinate system as being represented by equation 8 below:

$$[\sigma] = \begin{bmatrix} \sigma_x & \tau_{xy} & \tau_{xz} \\ \tau_{xy} & \sigma_y & \tau_{yz} \\ \tau_{xz} & \tau_{yz} & \sigma_z \end{bmatrix} = \begin{bmatrix} A & B\sin P + C\cos P & -B\cos P + C\sin P \\ D\sin P + G\cos P & \sin P(E\sin P + F\cos P) + \cos P(H\sin P + I\cos P) & \sin P(-E\cos P + F\sin P) + \cos P(-H\cos P + I\sin P) \\ -D\cos P + G\sin P & -\cos P(E\sin P + F\cos P) + \sin P(H\sin P + I\cos P) & -\cos P(-E\cos P + F\sin P) + \sin P(-H\cos P + I\sin P) \end{bmatrix} \tag{8}$$

where:

$$A = \sigma'_x\cos^2 T + \tau'_{xy}\sin 2T + \sigma'_y\sin^2 T \tag{9}$$

$$B = D = -\frac{1}{2}\sigma'_x\sin 2T + \tau'_{xy}\left(\cos^2 T - \sin^2 T\right) + \frac{1}{2}\sigma'_y\sin 2T \tag{10}$$

$$C = G = \tau'_{xz}\cos T + \tau'_{yz}\sin T \tag{11}$$

-continued $$E = \sigma'_x \sin^2 T - \tau'_{xy} \sin 2T + \sigma'_y \cos^2 T \quad (12)$$

$$F = H = -\tau'_{xz} \sin T + \tau'_{yz} \cos T \quad (13)$$

$$I = \sigma'_z. \quad (14)$$

$\sigma_x$, $\sigma_y$, $\sigma_z$ are normal stresses along the x, y and z axes respectively, $\tau_{xy}$, $\tau_{xz}$, $\tau_{yz}$ are shear stresses in the xy, xz and yz planes respectively, $\sigma'_x$, $\sigma'_y$, $\sigma'_z$ are normal stresses along the x', y' and z' axes respectively, and $\tau'_{xy}$, $\tau'_{xz}$, $\tau'_{yz}$ are shear stresses in the x'y', x'z' and y'z' planes respectively. Using equations 8-14 and some rearrangement, the following equations 15, 16 and 17 may be derived:

$$\sigma_x = \sigma'_x \cos^2 T + \tau'_{xy} \sin 2T + \sigma'_y \sin^2 T \quad (15)$$

$$\sigma_y = \sigma'_x \sin^2 T \cos^2 P + \sigma'_y \cos^2 T \sin^2 P + \sigma'_x \cos^2 P + \tau'_{xy} \sin 2T \sin^2 P - 2\tau'_{xz} \sin T \sin P \cos P + 2\tau'_{yz} \cos T \sin P \cos P \quad (16)$$

$$\tau_{xy} = -\frac{1}{2}\sigma'_x \sin 2T \sin P + \frac{1}{2}\sigma'_y \sin 2T \sin P + \tau'_{xy}\left(\cos^2 T \sin P - \sin^2 T \sin P\right) + \tau'_{xz} \cos T \cos P + \tau'_{yz} \sin T \cos P \quad (17)$$

Figure 16:
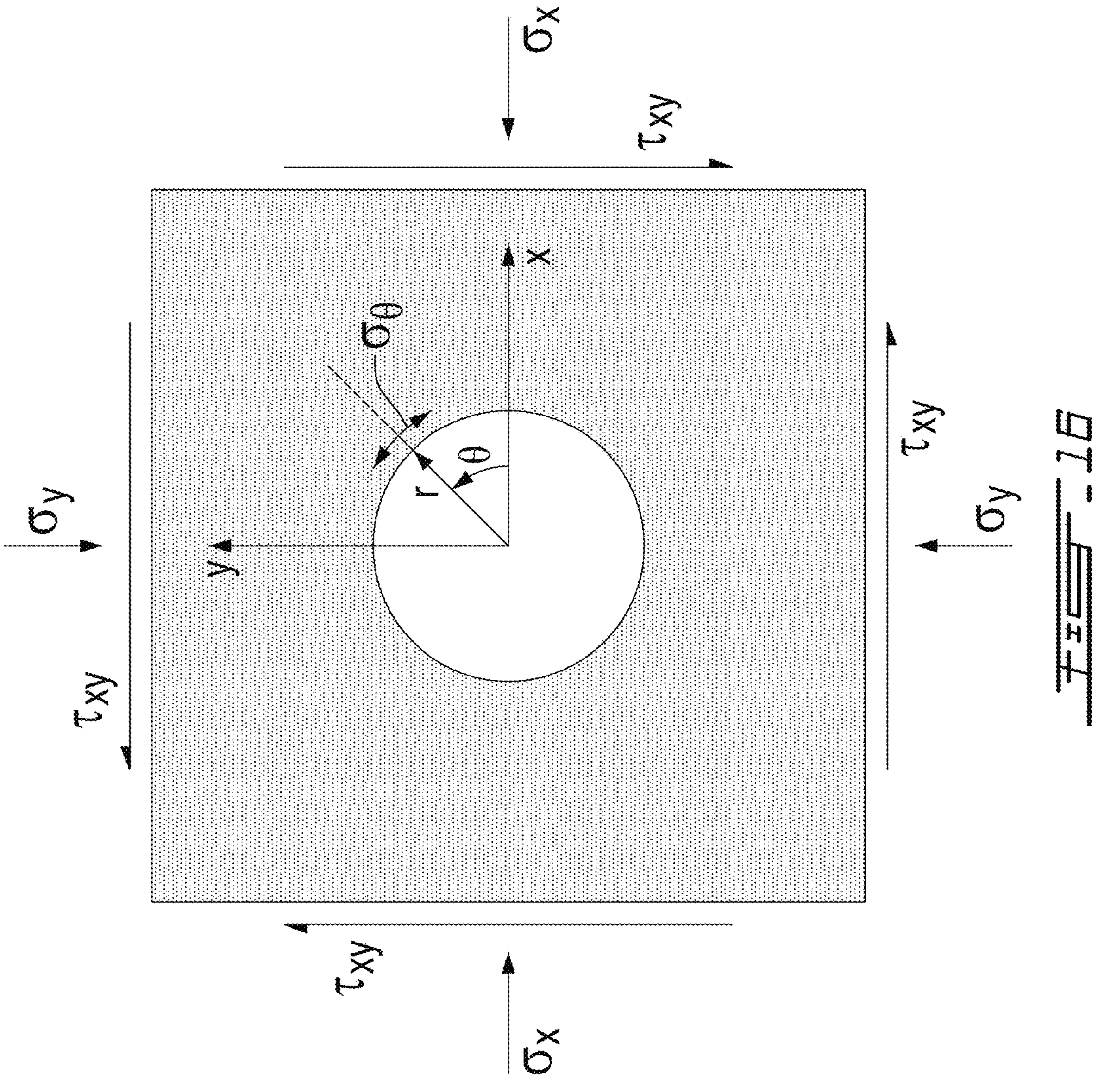
FIG. 16 is a transverse cross-sectional view of a borehole that is subjected to a stress state.

FIG. 16 is a transverse cross-sectional view of borehole 18 that is subjected to a stress state. The tangential stress $\sigma_\theta$ at the borehole wall at any polar angle θ from the x-axis may be calculated from equation 18 below:

$$\sigma_\theta = (1 - \cos 2\theta)\sigma_x + (1 + \cos 2\theta)\sigma_y - 4\tau_{xy} \sin 2\theta \quad (18)$$

Substituting equations 15-17 into equation 18 results in equation 19 below that may relate the far-field normal stresses $\sigma_x$, $\sigma_y$, $\sigma_z$, and shear stresses $\tau_{xy}$, $\tau_{xz}$, $\tau_{yz}$ to the tangential stress de around boreholes 18.

$$\sigma_\theta = \sigma_x\left[(1 - \cos 2\theta)\cos^2 T + (1 + \cos 2\theta)\sin^2 T \sin^2 P + 2 \sin 2\theta \sin 2T \sin P\right] + \sigma_y\left[(1 - \cos 2\theta)\sin^2 T + (1 + \cos 2\theta)\cos^2 T \sin^2 P - 2 \sin 2\theta \sin 2T \sin P\right] + \sigma_z\left[(1 + \cos 2\theta)\cos^2 P\right] + \tau_{xy}\left[-(1 + \cos 2\theta)\sin^2 P - 4 \sin 2\theta\left(\cos^2 T \sin P - \sin^2 T \sin P + (1 - \cos 2\theta)\sin 2T\right]\right. + \tau_{xz}[-4 \sin 2\theta \cos T \cos P - 2(\sin T \cos P \sin P)(1 + \cos 2\theta)] + \tau_{yz}[2(1 + \cos 2\theta] \cos T \cos P \sin P - 4 \sin 2\theta \sin T \cos P] \quad (19)$$

A six-variable linear equation 20 as shown below can be created by conducting six sleeve fracturing tests within three or more boreholes orientations and optionally using split tubular casing 50 or double split tubular casing 150. Each sleeve fracturing test may measure tangential stress de around borehole 18. In some embodiments, boreholes 18 may be evenly distributed in the space volume of rock mass 12 with relatively large differences in orientations. By conducting six tests, equation 20 below may be solved.

$$\begin{bmatrix}\sigma_{\theta 1}\\ \sigma_{\theta 2}\\ \sigma_{\theta 3}\\ \sigma_{\theta 4}\\ \sigma_{\theta 5}\\ \sigma_{\theta 6}\end{bmatrix} = \left[\begin{matrix}
(1-\cos 2\theta_1)\cos^2 T_i + (1+\cos 2\theta_1)\sin^2 T_i \sin^2 P_i + 2\sin 2\theta_1 \sin 2T_i \sin P_i\\
(1-\cos 2\theta_2)\cos^2 T_j + (1+\cos 2\theta_2)\sin^2 T_j \sin^2 P_j + 2\sin 2\theta_2 \sin 2T_j \sin P_j\\
(1-\cos 2\theta_3)\cos^2 T_k + (1+\cos 2\theta_3)\sin^2 T_k \sin^2 P_k + 2\sin 2\theta_3 \sin 2T_k \sin P_k\\
(1-\cos 2\theta_4)\cos^2 T_l + (1+\cos 2\theta_4)\sin^2 T_l \sin^2 P_l + 2\sin 2\theta_4 \sin 2T_l \sin P_l\\
(1-\cos 2\theta_5)\cos^2 T_m + (1+\cos 2\theta_5)\sin^2 T_m \sin^2 P_m + 2\sin 2\theta_5 \sin 2T_m \sin P_m\\
(1-\cos 2\theta_6)\cos^2 T_n + (1+\cos 2\theta_6)\sin^2 T_n \sin^2 P_n + 2\sin 2\theta_6 \sin 2T_n \sin P_n
\end{matrix}\right. \quad (20)$$

$$\begin{matrix}
(1-\cos 2\theta_1)\sin^2 T_i + (1+\cos 2\theta_1)\cos^2 T_i \sin^2 P_i - 2\sin 2\theta_1 \sin 2T_i \sin P_i\\
(1-\cos 2\theta_2)\sin^2 T_j + (1+\cos 2\theta_2)\cos^2 T_j \sin^2 P_j - 2\sin 2\theta_2 \sin 2T_j \sin P_j\\
(1-\cos 2\theta_3)\sin^2 T_k + (1+\cos 2\theta_3)\cos^2 T_k \sin^2 P_k - 2\sin 2\theta_3 \sin 2T_k \sin P_k\\
(1-\cos 2\theta_4)\sin^2 T_l + (1+\cos 2\theta_4)\cos^2 T_l \sin^2 P_l - 2\sin 2\theta_4 \sin 2T_l \sin P_l\\
(1-\cos 2\theta_5)\sin^2 T_m + (1+\cos 2\theta_5)\cos^2 T_m \sin^2 P_m - 2\sin 2\theta_5 \sin 2T_m \sin P_m\\
(1-\cos 2\theta_6)\sin^2 T_n + (1+\cos 2\theta_6)\cos^2 T_n \sin^2 P_n - 2\sin 2\theta_6 \sin 2T_n \sin P_n
\end{matrix}$$

$$\begin{matrix}
(1+\cos 2\theta_1)\cos^2 P_i - (1+\cos 2\theta_1)\sin 2T_i \sin^2 P_i - 4\sin 2\theta_1\\
(1+\cos 2\theta_2)\cos^2 P_j - (1+\cos 2\theta_2)\sin 2T_j \sin^2 P_j - 4\sin 2\theta_2\\
(1+\cos 2\theta_3)\cos^2 P_k - (1+\cos 2\theta_3)\sin 2T_k \sin^2 P_k - 4\sin 2\theta_3\\
(1+\cos 2\theta_4)\cos^2 P_l - (1+\cos 2\theta_4)\sin 2T_l \sin^2 P_l - 4\sin 2\theta_4\\
(1+\cos 2\theta_5)\cos^2 P_m - (1+\cos 2\theta_5)\sin 2T_m \sin^2 P_m - 4\sin 2\theta_5\\
(1+\cos 2\theta_6)\cos^2 P_n - (1+\cos 2\theta_6)\sin 2T_n \sin^2 P_n - 4\sin 2\theta_6
\end{matrix}$$

-continued $$\begin{array}{c}
\left(\cos^2 T_i \sin P_i - \sin^2 T_i \sin P_i\right) + (1 - \cos 2\theta_1) \sin 2T_i - \\
\left(\cos^2 T_j \sin P_j - \sin^2 T_j \sin P_j\right) + (1 - \cos 2\theta_2) \sin 2T_j - \\
\left(\cos^2 T_k \sin P_k - \sin^2 T_k \sin P_k\right) + (1 - \cos 2\theta_3) \sin 2T_k - \\
\left(\cos^2 T_l \sin P_l - \sin^2 T_l \sin P_l\right) + (1 - \cos 2\theta_4) \sin 2T_l - \\
\left(\cos^2 T_m \sin P_m - \sin^2 T_m \sin P_m\right) + (1 - \cos 2\theta_5) \sin 2T_m - \\
\left(\cos^2 T_n \sin P_n - \sin^2 T_n \sin P_n\right) + (1 - \cos 2\theta_6) \sin 2T_n -
\end{array}$$

$$\begin{array}{c}
4 \sin 2\theta_1 \cos T_i \cos P_i - 2(\sin T_i \cos P_i \sin P_i)(1 + \cos 2\theta_1)2(1 + \cos 2\theta_1) \\
4 \sin 2\theta_2 \cos T_j \cos P_j - 2(\sin T_j \cos P_j \sin P_j)(1 + \cos 2\theta_2)2(1 + \cos 2\theta_2) \\
4 \sin 2\theta_3 \cos T_k \cos P_k - 2(\sin T_k \cos P_k \sin P_k)(1 + \cos 2\theta_3)2(1 + \cos 2\theta_3) \\
4 \sin 2\theta_4 \cos T_l \cos P_l - 2(\sin T_l \cos P_l \sin P_l)(1 + \cos 2\theta_4)2(1 + \cos 2\theta_4) \\
4 \sin 2\theta_5 \cos T_m \cos P_m - 2(\sin T_m \cos P_m \sin P_m)(1 + \cos 2\theta_5)2(1 + \cos 2\theta_5) \\
4 \sin 2\theta_6 \cos T_n \cos P_n - 2(\sin T_n \cos P_n \sin P_n)(1 + \cos 2\theta_6)2(1 + \cos 2\theta_6)
\end{array}$$

$$\left.\begin{array}{c}
\cos T_i \cos P_i \sin P_i - 4 \sin 2\theta_1 \sin T_i \cos P_i \\
\cos T_j \cos P_j \sin P_j - 4 \sin 2\theta_2 \sin T_j \cos P_j \\
\cos T_k \cos P_k \sin P_k - 4 \sin 2\theta_3 \sin T_k \cos P_k \\
\cos T_l \cos P_l \sin P_l - 4 \sin 2\theta_4 \sin T_l \cos P_l \\
\cos T_m \cos P_m \sin P_m - 4 \sin 2\theta_5 \sin T_m \cos P_m \\
\cos T_n \cos P_n \sin P_n - 4 \sin 2\theta_6 \sin T_n \cos P_n
\end{array}\right]
\begin{bmatrix} \sigma'_x \\ \sigma'_y \\ \sigma'_z \\ \tau'_{xy} \\ \tau'_{xz} \\ \tau'_{yz} \end{bmatrix}.$$

The six unknown parameters of the in-situ stress tensor [σ] can be computed by rearranging and solving equation 20, which includes a set of linear equations. To mathematically have a solution for equation 20, six sleeve fracturing tests using three different borehole orientations (e.g., two sleeve fracturing tests in each of three boreholes 18) may be required. Indices 1 to 6 used with polar angle θ (degrees) are used to identify the specific fracture 48 associated with that polar angle θ. Indices i to n are used to identify the associated borehole orientation (or borehole 18) in which the fracture 48 is induced. It may be preferable to have a relatively large difference in orientations between the three borehole orientations, but this is not necessarily required. An exemplary layout of six sleeve fracturing tests in three boreholes 18A-18C suitable for solving equation 20 is illustrated in FIG. 14. For simplicity, the height and width of underground excavation 14 are shown as being of equal dimension W but this may not necessarily be the case.

Figures 17A, 17B:
FIG. 17A is a table of numerical values associated with six oriented sleeve fracturing tests performed in a rock mass.
FIG. 17B is a table of numerical values defining a complete stress tensor computed from the values in the table of FIG. 17A.

FIGS. 17A and 17B illustrate a first numerical example of determining a stress tensor [σ] in rock mass 12 using equation 20. FIG. 17A is a table of exemplary numerical values associated with six split tube sleeve fracturing tests performed in three boreholes 18 having different orientations based on the layout shown in FIG. 14. The sleeve fracturing tests represented in the table of FIG. 17A are based on the use of split tubular casing 50. Each sleeve fracturing test has a trend T (degrees) of borehole 18, a plunge P (degrees) of borehole 18, a polar angle θ (degrees) of split plane SP and a corresponding value of tangential stress $\sigma_\theta$ determined as explained above based on the measured fracture pressure(s).

FIG. 17B is a table of numerical values defining the components of a complete stress tensor [σ] computed from the values in the table of FIG. 17A using equation 20. Stress tensor [σ] may define the state of stress in the applicable segment of rock mass 12. Stress tensor transformation rules may be used to transform stress tensor [σ] to determine the magnitudes and directions of the principal stresses where the shear stress components are zero.

Figures 18A, 18B:
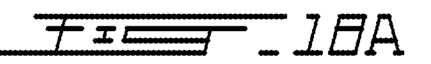
FIG. 18A is a table of numerical values associated with another six oriented sleeve fracturing tests performed in a rock mass.
FIG. 18B is a table of numerical values defining a complete stress tensor computed from the values in the table of FIG. 18A.

FIGS. 18A and 18B illustrate a second numerical example of determining a stress tensor [σ] in rock mass 12 using equation 20. FIG. 18A is a table of exemplary numerical values associated with six split tube sleeve fracturing tests performed in three boreholes 18 having different orientations based on the layout shown in FIG. 14. The sleeve fracturing tests represented in the table of FIG. 18A are based on the use of split tubular casing 50. Each sleeve fracturing tests returns trend T (degrees) of borehole 18, plunge P (degrees) of borehole 18, polar angle θ (degrees) of split plane SP and a corresponding value of tangential stress $\sigma_\theta$ determined as explained above based on the measured fracture pressure(s).

FIG. 18B is a table of numerical values defining the components of a complete stress tensor [σ] computed from the values in the table of FIG. 18A using equation 20. Stress tensor [σ] may define the state of stress in the applicable segment of rock mass 12. Since the shear stresses have values of zero in this example, this means that the principal stresses coincide with the x', y', z' coordinate system shown in FIG. 15A. In other words, the intermediate principal stress is parallel to the E axis, the maximum principal stress is parallel to the N axis and the minimum principal stress is parallel to the vertical axis Z in the left-handed N, E, Z coordinate system shown in FIG. 15A.

FIG. 19 is a schematic illustration of system 10 or other sleeve fracturing system being used in measuring stress in rock mass 12 using sleeve fracturing from above ground instead of under ground. Accordingly, sleeve fracture testing (e.g., using split tubular casing 50 or double split tubular casing 150) may be conducted from ground surface 19 into one or more boreholes 18A-18C that are accessible from ground surface 19. Ground surface 19 may be an outer surface of the earth that is not under ground. In some embodiments, ground surface 19 may be inside an open pit for example. The methods of measuring and/or determining stresses that are described herein may be used with one or more boreholes 18 that are drilled from underground excavation 14 or that are drilled from ground surface 19.

When sleeve fracturing is performed from ground surface 19 and sleeve 16 is inserted relatively deep and far (e.g., more than 1 km) from ground surface 19, some elements of system 10 such as pump 20 and/or pressure sensor 34 may be configured to be inserted into borehole(s) 18 to permit pump 20 and/or pressure sensor 34 to be in relatively close proximity to sleeve 16 and promote accurate measurement of fracture-closure pressure Pc and/or the fracture-reopening pressure Pr.

FIG. 19 shows another exemplary layout of six sleeve fracturing tests in three boreholes 18A-18C (e.g., two sleeve fracturing tests per borehole 18) suitable for solving equation 20. Accordingly, an arrangement of boreholes 18A-18C as shown in FIG. 19 may be used to derive a complete stress tensor [σ] to define the state of stress in the applicable segment of rock mass 12 that is below ground surface 19. In various embodiments, boreholes 18A-18C may be branches from a main borehole or may be separate boreholes that are separately drilled from ground surface 19.

As can be seen therefore, the examples described above and illustrated are intended to be exemplary only. The scope is indicated by the appended claims.

What is claimed is:

1. A method for determining a stress tensor defining a state of stress in a segment of rock mass, the method comprising:

conducting six sleeve fracturing tests in the segment of rock mass, the six sleeve fracturing tests including three different borehole orientations;

determining tangential stresses ($\sigma_{\theta 1}$-$\sigma_{\theta 6}$) respectively associated with the six sleeve fracturing tests; and determining the stress tensor using the tangential stresses ($\sigma_{\theta 1}$-$\sigma_{\theta 6}$), wherein:

the six sleeve fracturing tests each have a trend ($T_i$-$T_n$) of the borehole orientation, a plunge ($P_i$-$P_n$) of the borehole orientation, a polar angle ($\theta_1$-$\theta_6$) of a location of a fracture about a borehole;

the stress tensor includes: three normal stresses ($\sigma'_x$, $\sigma'_y$, $\sigma'_z$) in three orthogonal directions and three shear stresses ($\tau'_{xy}$, $\tau'_{xz}$, $\tau'_{yz}$) associated with the three orthogonal directions; and determining the stress tensor includes solving the following equation:

$$\begin{bmatrix} \sigma_{\theta 1} \\ \sigma_{\theta 2} \\ \sigma_{\theta 3} \\ \sigma_{\theta 4} \\ \sigma_{\theta 5} \\ \sigma_{\theta 6} \end{bmatrix} =$$

-continued $$\begin{bmatrix}
(1-\cos 2\theta_1)\cos^2 T_i + (1+\cos 2\theta_1)\sin^2 T_i \sin^2 P_i + 2\sin 2\theta_1 \sin 2T_i \sin P_i &
(1-\cos 2\theta_1)\sin^2 T_i + (1+\cos 2\theta_1)\cos^2 T_i \sin^2 P_i - 2\sin 2\theta_1 \sin 2T_i \sin P_i &
(1+\cos 2\theta_1)\cos^2 P_i - (1+\cos 2\theta_1)\sin 2T_i \sin^2 P_i - 4\sin 2\theta_1 &
\left(\cos^2 T_i \sin P_i - \sin^2 T_i \sin P_i\right) + (1-\cos 2\theta_1)\sin 2T_i - &
4\sin 2\theta_1 \cos T_i \cos P_i - 2(\sin T_i \cos P_i \sin P_i)(1+\cos 2\theta_1)2(1+\cos 2\theta_1) &
\cos T_i \cos P_i \sin P_i - 4\sin 2\theta_1 \sin T_i \cos P_i \\
(1-\cos 2\theta_2)\cos^2 T_j + (1+\cos 2\theta_2)\sin^2 T_j \sin^2 P_j + 2\sin 2\theta_2 \sin 2T_j \sin P_j &
(1-\cos 2\theta_2)\sin^2 T_j + (1+\cos 2\theta_2)\cos^2 T_j \sin^2 P_j - 2\sin 2\theta_2 \sin 2T_j \sin P_j &
(1+\cos 2\theta_2)\cos^2 P_j - (1+\cos 2\theta_2)\sin 2T_j \sin^2 P_j - 4\sin 2\theta_2 &
\left(\cos^2 T_j \sin P_j - \sin^2 T_j \sin P_j\right) + (1-\cos 2\theta_2)\sin 2T_j - &
4\sin 2\theta_2 \cos T_j \cos P_j - 2(\sin T_j \cos P_j \sin P_j)(1+\cos 2\theta_2)2(1+\cos 2\theta_2) &
\cos T_j \cos P_j \sin P_j - 4\sin 2\theta_2 \sin T_j \cos P_j \\
(1-\cos 2\theta_3)\cos^2 T_k + (1+\cos 2\theta_3)\sin^2 T_k \sin^2 P_k + 2\sin 2\theta_3 \sin 2T_k \sin P_k &
(1-\cos 2\theta_3)\sin^2 T_k + (1+\cos 2\theta_3)\cos^2 T_k \sin^2 P_k - 2\sin 2\theta_3 \sin 2T_k \sin P_k &
(1+\cos 2\theta_3)\cos^2 P_k - (1+\cos 2\theta_3)\sin 2T_k \sin^2 P_k - 4\sin 2\theta_3 &
\left(\cos^2 T_k \sin P_k - \sin^2 T_k \sin P_k\right) + (1-\cos 2\theta_3)\sin 2T_k - &
4\sin 2\theta_3 \cos T_k \cos P_k - 2(\sin T_k \cos P_k \sin P_k)(1+\cos 2\theta_3)2(1+\cos 2\theta_3) &
\cos T_k \cos P_k \sin P_k - 4\sin 2\theta_3 \sin T_k \cos P_k \\
(1-\cos 2\theta_4)\cos^2 T_l + (1+\cos 2\theta_4)\sin^2 T_l \sin^2 P_l + 2\sin 2\theta_4 \sin 2T_l \sin P_l &
(1-\cos 2\theta_4)\sin^2 T_l + (1+\cos 2\theta_4)\cos^2 T_l \sin^2 P_l - 2\sin 2\theta_4 \sin 2T_l \sin P_l &
(1+\cos 2\theta_4)\cos^2 P_l - (1+\cos 2\theta_4)\sin 2T_l \sin^2 P_l - 4\sin 2\theta_4 &
\left(\cos^2 T_l \sin P_l - \sin^2 T_l \sin P_l\right) + (1-\cos 2\theta_4)\sin 2T_l - &
4\sin 2\theta_4 \cos T_l \cos P_l - 2(\sin T_l \cos P_l \sin P_l)(1+\cos 2\theta_4)2(1+\cos 2\theta_4) &
\cos T_l \cos P_l \sin P_l - 4\sin 2\theta_4 \sin T_l \cos P_l \\
(1-\cos 2\theta_5)\cos^2 T_m + (1+\cos 2\theta_5)\sin^2 T_m \sin^2 P_m + 2\sin 2\theta_5 \sin 2T_m \sin P_m &
(1-\cos 2\theta_5)\sin^2 T_m + (1+\cos 2\theta_5)\cos^2 T_m \sin^2 P_m - 2\sin 2\theta_5 \sin 2T_m \sin P_m &
(1+\cos 2\theta_5)\cos^2 P_m - (1+\cos 2\theta_5)\sin 2T_m \sin^2 P_m - 4\sin 2\theta_5 &
\left(\cos^2 T_m \sin P_m - \sin^2 T_m \sin P_m\right) + (1-\cos 2\theta_5)\sin 2T_m - &
4\sin 2\theta_5 \cos T_m \cos P_m - 2(\sin T_m \cos P_m \sin P_m)(1+\cos 2\theta_5)2(1+\cos 2\theta_5) &
\cos T_m \cos P_m \sin P_m - 4\sin 2\theta_5 \sin T_m \cos P_m \\
(1-\cos 2\theta_6)\cos^2 T_n + (1+\cos 2\theta_6)\sin^2 T_n \sin^2 P_n + 2\sin 2\theta_6 \sin 2T_n \sin P_n &
(1-\cos 2\theta_6)\sin^2 T_n + (1+\cos 2\theta_6)\cos^2 T_n \sin^2 P_n - 2\sin 2\theta_6 \sin 2T_n \sin P_n &
(1+\cos 2\theta_6)\cos^2 P_n - (1+\cos 2\theta_6)\sin 2T_n \sin^2 P_n - 4\sin 2\theta_6 &
\left(\cos^2 T_n \sin P_n - \sin^2 T_n \sin P_n\right) + (1-\cos 2\theta_6)\sin 2T_n - &
4\sin 2\theta_6 \cos T_n \cos P_n - 2(\sin T_n \cos P_n \sin P_n)(1+\cos 2\theta_6)2(1+\cos 2\theta_6) &
\cos T_n \cos P_n \sin P_n - 4\sin 2\theta_6 \sin T_n \cos P_n
\end{bmatrix}
\begin{bmatrix} \sigma'_x \\ \sigma'_y \\ \sigma'_z \\ \tau'_{xy} \\ \tau'_{xz} \\ \tau'_{yz} \end{bmatrix}.$$

* * * * *